(12) United States Patent
Lam

(10) Patent No.: US 12,007,041 B2
(45) Date of Patent: Jun. 11, 2024

(54) LIQUID DISPENSING DEVICE HAVING A NOZZLE AND NEEDLE ASSEMBLY

(71) Applicant: TECHTRONIC CORDLESS GP, Anderson, SC (US)

(72) Inventor: Chin Hung Lam, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 1335 days.

(21) Appl. No.: 16/542,333

(22) Filed: Aug. 16, 2019

(65) Prior Publication Data

US 2020/0056721 A1 Feb. 20, 2020

(30) Foreign Application Priority Data

Aug. 16, 2018 (HK) .................. 18110557.4

(51) Int. Cl.
| | |
|---|---|
| *F16K 31/58* | (2006.01) |
| *B05B 3/10* | (2006.01) |
| *F16K 31/122* | (2006.01) |
| *B05B 1/30* | (2006.01) |
| *B05B 7/02* | (2006.01) |
| *B05B 7/06* | (2006.01) |

(Continued)

(52) U.S. Cl.
CPC ............ *F16K 31/58* (2013.01); *B05B 3/1042* (2013.01); *F16K 31/1221* (2013.01); *B05B 1/3046* (2013.01); *B05B 7/02* (2013.01); *B05B 7/066* (2013.01); *B05B 7/0815* (2013.01); *B05B 7/2408* (2013.01); *B05B 7/2435* (2013.01); *B05B 7/2478* (2013.01); *B05B 7/2489* (2013.01); *B05B 12/002* (2013.01); *B05B 15/30* (2018.02); *Y10S 239/14* (2013.01)

(58) Field of Classification Search
CPC ... F16K 31/58; F16K 31/1221; B05B 3/1042; B05B 1/3046; B05B 7/02; B05B 7/066; B05B 7/0815; B05B 7/2408; B05B 7/2435; B05B 7/2478; B05B 7/2489; B05B 12/002; B05B 15/30; B05B 7/2418; B05B 7/2432; B05B 12/36; Y10S 239/14
See application file for complete search history.

(56) References Cited

U.S. PATENT DOCUMENTS 2,079,933 A * 5/1937 Fisher ................ B05B 7/066
239/375
2,842,094 A * 7/1958 O'Neill ................ B05B 12/36
118/301

(Continued)

FOREIGN PATENT DOCUMENTS

| CN | 204562024 U | * | 8/2015 | |
|---|---|---|---|---|
| CN | 105107653 A | * | 12/2015 | .......... B05B 12/002 |

(Continued)

OTHER PUBLICATIONS

European Patent Office Extended Search Report for Application No. 19191806.9 dated Dec. 16, 2019 (9 pages).

*Primary Examiner* — Stephen Hobson
(74) *Attorney, Agent, or Firm* — Michael Best & Friedrich LLP

(57) ABSTRACT

A liquid dispensing device includes a body, a nozzle on an end of the body, a liquid container coupled to the body, and a piston configured to move in the body so as to control an ejection of liquid from the nozzle. The piston and the nozzle are configured to be detached from the body as an assembly.

17 Claims, 14 Drawing Sheets

(51) Int. Cl.
   *B05B 7/08*   (2006.01)
   *B05B 7/24*   (2006.01)
   *B05B 12/00*  (2018.01)
   *B05B 15/30*  (2018.01)

(56) References Cited

U.S. PATENT DOCUMENTS

| | | | | |
|---|---|---|---|---|
| 4,974,532 A * | 12/1990 | March | ............... | B05B 12/22 118/301 |
| 5,340,026 A * | 8/1994 | Woodruff | ............... | B05B 12/36 239/526 |
| 6,585,173 B2 * | 7/2003 | Schmon | ............... | B05B 12/008 239/296 |
| 7,350,723 B2 * | 4/2008 | Reedy | ............... | B05B 7/2478 239/296 |
| 7,484,676 B2 * | 2/2009 | Joseph | ............... | B05B 7/2408 239/290 |
| 7,694,893 B2 * | 4/2010 | Zittel | ............... | B01F 33/50114 239/117 |
| 7,789,324 B2 * | 9/2010 | Bouic | ............... | B05B 7/2408 285/361 |
| 7,922,107 B2 * | 4/2011 | Fox | ............... | B05B 1/3046 239/377 |
| 8,632,022 B2 * | 1/2014 | Potter | ............... | B05B 12/36 239/521 |
| 8,899,501 B2 * | 12/2014 | Fox | ............... | B05B 7/0815 239/377 |
| 9,333,519 B2 * | 5/2016 | Brose | ............... | B05B 7/2478 |
| 9,358,561 B2 * | 6/2016 | Johnson | ............... | B05B 7/2435 |
| 9,409,197 B2 * | 8/2016 | Gehrung | ............... | B05B 15/50 |
| 10,493,577 B2 * | 12/2019 | Furusawa | ............... | B23Q 11/0071 |
| 11,413,635 B2 * | 8/2022 | Ross | ............... | B05B 7/1254 |
| D991,514 S * | 7/2023 | Lam | ............... | D26/40 |
| 2005/0145724 A1 * | 7/2005 | Blette | ............... | B05B 7/1209 239/290 |
| 2005/0242207 A1 * | 11/2005 | Tejeda | ............... | B05B 7/1272 239/338 |
| 2008/0029619 A1 * | 2/2008 | Gohring | ............... | B05B 7/0815 239/596 |
| 2008/0078849 A1 * | 4/2008 | Fox | ............... | B05B 7/1209 239/302 |
| 2008/0272213 A1 * | 11/2008 | Ting | ............... | B05B 7/0815 239/461 |
| 2009/0152378 A1 * | 6/2009 | Potter | ............... | B05B 12/36 239/514 |
| 2009/0188691 A1 * | 7/2009 | Hahn | ............... | B25D 17/043 173/162.2 |
| 2009/0230218 A1 * | 9/2009 | Drozd | ............... | B05B 7/066 239/300 |
| 2010/0155095 A1 * | 6/2010 | Furusawa | ............... | B23Q 11/0046 173/198 |
| 2010/0163654 A1 * | 7/2010 | Bass | ............... | B05B 7/083 239/574 |
| 2010/0206963 A1 * | 8/2010 | Huang | ............... | B05B 7/083 239/290 |
| 2011/0008118 A1 * | 1/2011 | Yoshikane | ............... | B23Q 11/0046 408/67 |
| 2011/0114749 A1 * | 5/2011 | Munn | ............... | B05B 12/008 239/74 |
| 2011/0168811 A1 * | 7/2011 | Fox | ............... | B05B 1/3046 239/526 |
| 2011/0174903 A1 * | 7/2011 | Hogan | ............... | B05B 12/34 239/754 |
| 2011/0226499 A1 * | 9/2011 | Kakiuchi | ............... | B23Q 11/0046 173/75 |
| 2011/0226502 A1 * | 9/2011 | Bito | ............... | B23Q 11/0046 173/171 |
| 2011/0308830 A1 * | 12/2011 | Furusawa | ............... | B25F 5/003 173/198 |
| 2012/0043101 A1 * | 2/2012 | Ishikawa | ............... | B28D 7/02 173/75 |
| 2012/0273243 A1 * | 11/2012 | Tada | ............... | B23Q 11/0046 173/198 |
| 2012/0298391 A1 * | 11/2012 | Kakiuchi | ............... | B23Q 11/0046 173/217 |
| 2013/0055523 A1 * | 3/2013 | Yoshikane | ............... | B28D 7/02 15/347 |
| 2013/0213683 A1 * | 8/2013 | Brewster | ............... | B23Q 11/00 173/198 |
| 2013/0320110 A1 * | 12/2013 | Brose | ............... | B05B 7/2478 239/302 |
| 2016/0318056 A1 * | 11/2016 | Santiago | ............... | B05B 9/01 |
| 2018/0132472 A1 * | 5/2018 | George | ............... | A01M 21/043 |
| 2020/0055071 A1 * | 2/2020 | Lam | ............... | B05B 12/36 |
| 2022/0369801 A1 * | 11/2022 | Hung | ............... | B05B 15/654 |
| 2023/0145062 A1 * | 5/2023 | Duncan | ............... | B05B 7/2416 137/15.01 |

FOREIGN PATENT DOCUMENTS

| | | | | |
|---|---|---|---|---|
| CN | 103717314 B | * | 2/2017 | ............ B05B 15/50 |
| CN | 114396487 A | * | 4/2022 | |
| DE | 102004027789 A1 | | 2/2005 | |
| DE | 202015003663 U1 | | 9/2016 | |
| EP | 1340550 A2 | * | 9/2003 | ............ B05B 1/3046 |
| EP | 1340550 A2 | | 9/2003 | |
| GB | 508734 A | | 7/1939 | |
| WO | 2009015260 A2 | | 1/2009 | |
| WO | WO-2023081022 A1 | * | 5/2023 | |

* cited by examiner

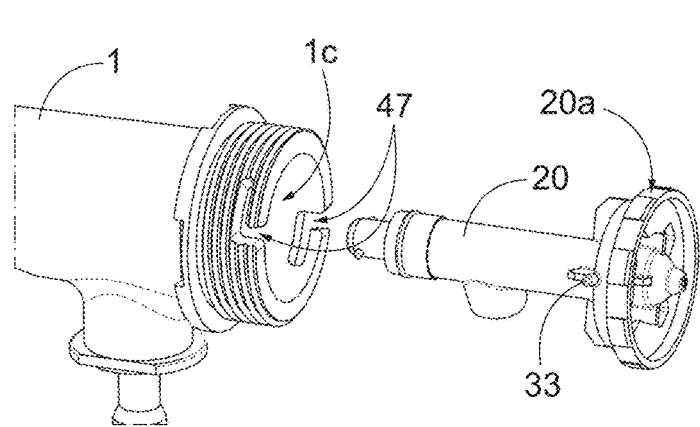
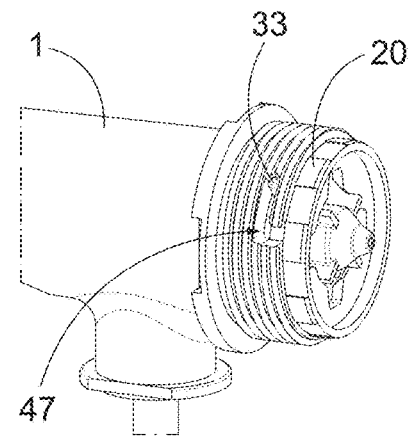
FIG. 16a   FIG. 16b
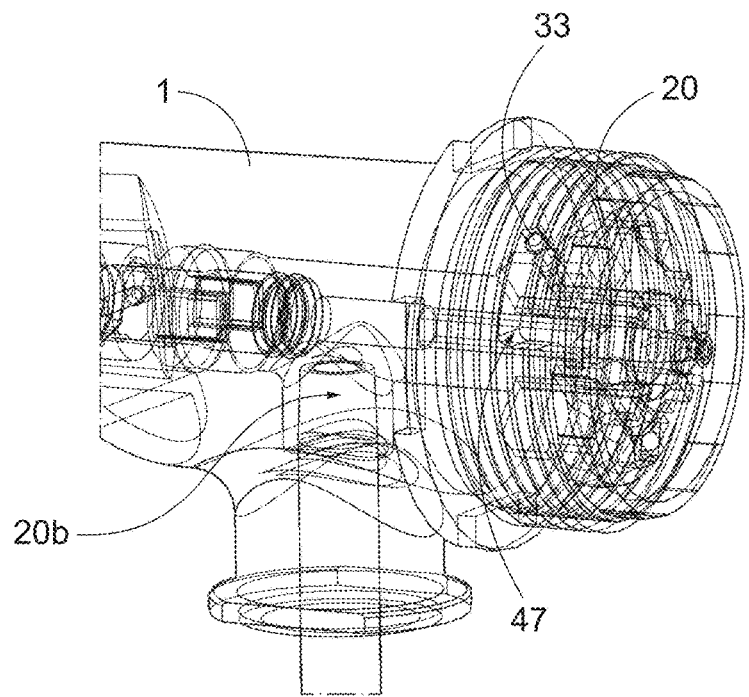
FIG. 17 ered on an end of the body, a liquid container connected to the body, and a shielding member connected to the body. The liquid container is adapted to be made in fluid commu-

LIQUID DISPENSING DEVICE HAVING A NOZZLE AND NEEDLE ASSEMBLY

CROSS-REFERENCE TO RELATED APPLICATIONS

This application claims priority to Hong Kong Short Term Patent Application No. 18110557.4 Filed on 16 Aug. 2018, the entire contents of which is incorporated herein by reference.

FIELD OF THE INVENTION

This invention relates to a liquid dispensing device and in particular a handheld liquid dispensing device using high-pressure air to atomize the liquid for dispensing.

BACKGROUND OF THE INVENTION

Handheld paint sprayers are commonly used in indoor decorations and advertisement works. The paint sprayer usually contains a container storing the paint, and a nozzle which is selectively made in fluid communication with the container according to operation by the user, so that paint in the container can flow to the nozzle and be ejected from the nozzle for spraying on a target surface, such as a wall. The paint is extracted from the container to the nozzle by air pressure, for example when the paint sprayer is connected to an external air source. The external pressurized air when introduced into the container creates a pressure that forces the paint to flow through a feeding tube to the nozzle.

However, conventional paint sprayers suffer from many drawbacks that cause inconvenience to the user. For example, it is usually very difficult to clean the interior of the nozzle and the associated paint flow channel in the paint sprayer, where hardened paint residues may accumulation after long time of use. The whole paint sprayer may have to be disassembled to individual part, and this is quite troublesome to the end-user or even impossible. In addition, for conventional paint sprayers, the user has to be very skillful or careful to control the output effect of the paint spraying, in order to produce a paint pattern on the target surface with a clear and sharp boundary. Lastly, the design of the paint container in conventional paint sprayers often prevent efficient utilization of paints in the container, as there are always parts of the interior space of the container that cannot be reached by the feeding tube.

SUMMARY OF THE INVENTION

In the light of the foregoing background, it is an object of the invention to provide an alternate liquid dispensing device which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the invention.

Accordingly, the invention, in one aspect, is a liquid dispensing device which includes a body, a nozzle configured on an end of the body, a liquid container connected to the body, and a shielding member connected to the body. The liquid container is adapted to be made in fluid communication with the nozzle. The shielding member is adapted to block an ejected liquid from the nozzle in order to form a clean edge of the liquid on a target surface to which the liquid is applied.

Preferably, the shielding member is removably connected to the end of the body.

Additionally or alternatively, the shielding member is adapted to be moved relative to the body, so as to be positioned at different orientations/positions with respect to the nozzle.

According to a variation of the preferred embodiments, the shielding member has a substantially disc shape.

According to another variation of the preferred embodiments, the shielding member is fixed to a collar ring which is adapted to be detachably installed to the body around an outlet of the nozzle.

According to a second aspect of the invention, there is disclosed a liquid dispensing device which includes a body, a nozzle configured on an end of the body, a liquid container connected to the body, and a feeding tube which is adapted to be made in fluid communication with the nozzle. A movable part of the feeding tube that is inserted into the liquid container is deviated from a central axis of the liquid container. The feeding tube is adapted to be manually adjusted, as a result of which the movable part of the feeding tube is moved to different positions relative to the central axis.

Preferably, the feeding tube further contains a fixed part substantially extending along the central axis and connected to the movable part. The movable part forms an acute angle with the central axis.

More preferably, the fixed part of the feeding tube is connected to the liquid container in a way that the fixed part and the liquid container are adapted to rotate together around the central axis. The movable part is adapted to pivot as a result of the rotation of the fixed part.

Most preferably, the liquid dispensing device further contains a locking device configured for locking the fixed part and the liquid container from relative rotation to the body.

According to a variation of the preferred embodiments, the locking device contains a locking member movable along a direction parallel to the central axis between a locking position and an unlocking position. The locking member engages with a corresponding locking feature on the fixed part or the liquid container at the locking position.

According to a third aspect of the invention, there is disclosed a liquid dispensing device which includes a body, a nozzle removably configured on an end of the body, a liquid container connected to the body, and a feeding tube which is adapted to be made in fluid communication with the nozzle. The nozzle contains a part of a liquid channel to which the feeding tube is connected removably at an angle.

Preferably, the feeding tube further contains a first part and a second part which is detachably connected to the first part. The second part at least partially is inserted in the liquid container. The first part is connected removably to the nozzle.

More preferably, the first part of the feeding tube extends substantially perpendicularly to the part of the liquid channel in the nozzle.

According to a variation of the preferred embodiments, the nozzle contains an annular part defining a liquid outlet, and an elongated part connected to the annular part which defines the part of the liquid channel.

According to a fourth aspect of the invention, there is disclosed a liquid dispensing device which includes a body, a nozzle on an end of the body, a liquid container coupled to the body, and a piston configured to move in the body so as to control an ejection of liquid from the nozzle. The piston and the nozzle are configured to be detached from the body as an assembly.

Preferably, the liquid dispensing device contains an actuating member that is adapted to move relative to the body. The piston is removably connected to the actuating member.

More preferably, the piston connects through a turn-to-lock structure to the actuating member.

Additionally, the nozzle is removably connected to the body through a turn-to-lock structure.

There are many advantages to the invention. Firstly, some embodiments of the invention provide an edger accessory containing a shielding member for the ejected paint. The edger accessory can be removably connected to the paint sprayer so if it is not needed the user does not always need to have it on the paint sprayer. The shielding member in the form of a disc could effectively block any ejected paint from passing beyond the shielding member, and on the target surface this would achieve a very sharp and clean edge of the painted pattern. The edger accessary can also be installed to the painter sprayer along different directions/positions, thus providing flexibility to the use of the edger accessory to produce desired paint pattern.

In addition, some of the embodiments provide a rotatable feeding tube mechanism which can be actuated by the user with his/her hand. The rotatable feeding tube, together with its bend design at the tip end, allows paint located in most areas in the container (e.g. corners at the bottom) to be accessible by the feeding tube and be driven into the feeding tube. This reduces the amount of unused paint in the container before the container has to be detached from the paint sprayer and be refilled next time. The locking device equipped for the rotating feeding tube also provides a locking to the container and the feeding tube in case the user does not want the feeding tube/paint container to be unintentionally rotated during operation.

Another advantage of the invention is that in some embodiments, it allows the nozzle and needle (which is the piston) assembly to be detached from the paint sprayer without having to dissemble the whole sprayer. The nozzle is also integrated with a length of paint channel and the feeding tube can be detachably connected to the nozzle at an angle (e.g. 90 degrees). The feeding tube itself contains two parts that can be separated from each other. All these modular designs allow the interior parts of the paint sprayer, in particular the pain flow channel, to be cleaned easily by the end-user without having to rely on a professional technician or dissemble the entire paint sprayer.

BRIEF DESCRIPTION OF THE DRAWINGS

The foregoing and further features of the invention will be apparent from the following description of preferred embodiments which are provided by way of example only in connection with the accompanying figures, of which:

FIGS. 16a and 16b show respectively the nozzle separated from the housing and the two assembled together, in the paint sprayer of FIG. 3.

FIG. 17 shows a transparent view of the nozzle in the housing when the two are assembled together in the paint sprayer of FIG. 3.

FIG. 21a shows an adapter installed to the nozzle of the paint sprayer according to another embodiment of the invention.

FIG. 21b shows the shape of the adapter in FIG. 21a.

In the drawings, like numerals indicate like parts throughout the several embodiments described herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
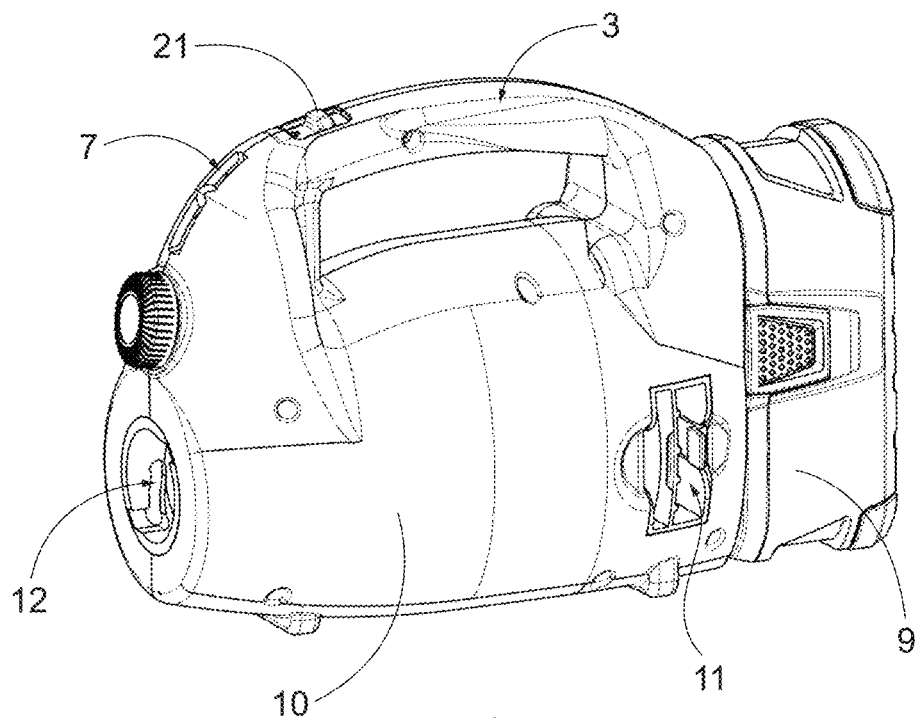
FIG. 1 is a perspective view of a main unit suitable for use with a paint sprayer according to an embodiment of the invention.
Figure 2:
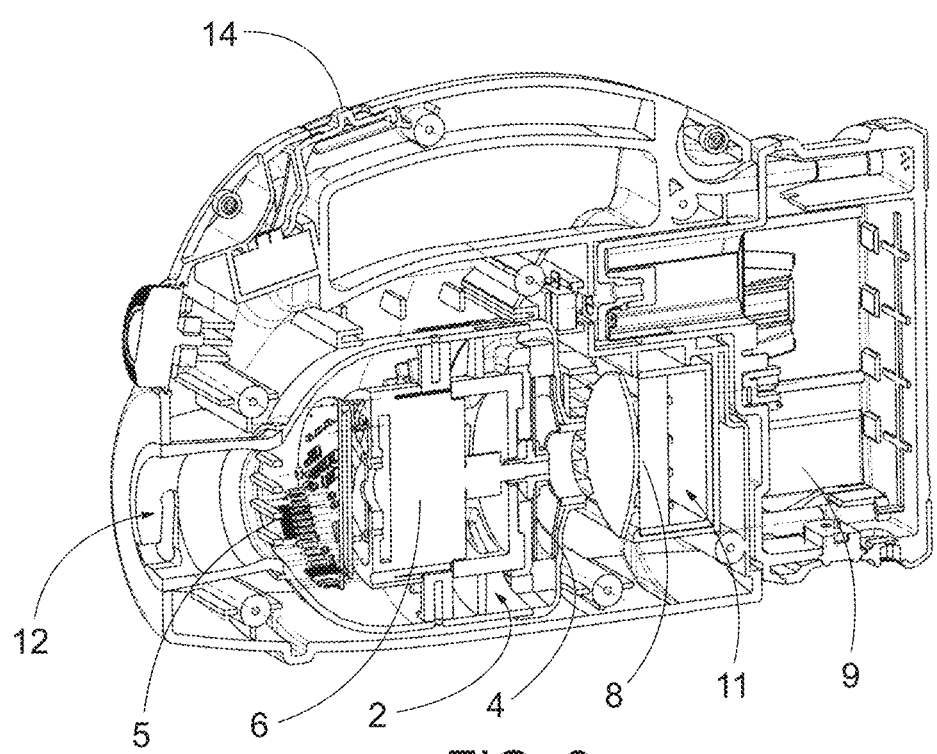
FIG. 2 is a cross-sectional view of the main unit in FIG. 1.

Referring now to FIGS. 1-2, the first embodiment of the invention is a main unit for use together with a handheld paint sprayer (which is not shown in FIGS. 1-2). The main unit is used to generate pressurized air for use by the handheld paint sprayer. The main unit contains a housing 10 with an air outlet 12 configured to output the pressurized air to the paint sprayer through a hose (not shown). The main unit also contains a handle 3 formed at an upper portion of the housing 10 for carrying the main unit by the user. The main unit is a portable device just like the paint sprayer that will be described later, and the main unit is powered by a removable battery pack 9 installed to the rear end of the housing 10. A trigger switch 21 is configured on the handle 3 which can be actuated to control the operation of the main unit. There are also multiple strap hooks 7 formed on the housing 10 (FIG. 1 only shows one of them) which can be used to connect a strap so that the user can carry the main unit using the strap. On the housing 10 there is a tray 11 for inserting a removable filter (not shown in FIG. 1).

FIG. 2 shows more details about the internal components of the main unit. The air outlet 12 is in fluid communication with the internal chamber 2 of the main unit, where the internal chamber 2 accommodates a motor 6, a fan 4 that is driven by the motor 6, and a circuit board 5. An air filter 8 is shown in FIG. 2 as being received in the tray 11. The air tray 11 acts as an air inlet for the main unit such that any intake air will firstly pass through the air filter 8 before the air is suctioned by the fan 4 in the air path. The circuit board 5 is also placed in the air path, so the intake air would facilitate dissipating heat generated on the circuit board 5. The air flow caused by the fan 4 then goes out of the main unit to the paint sprayer through the air outlet 12.

Figure 3:
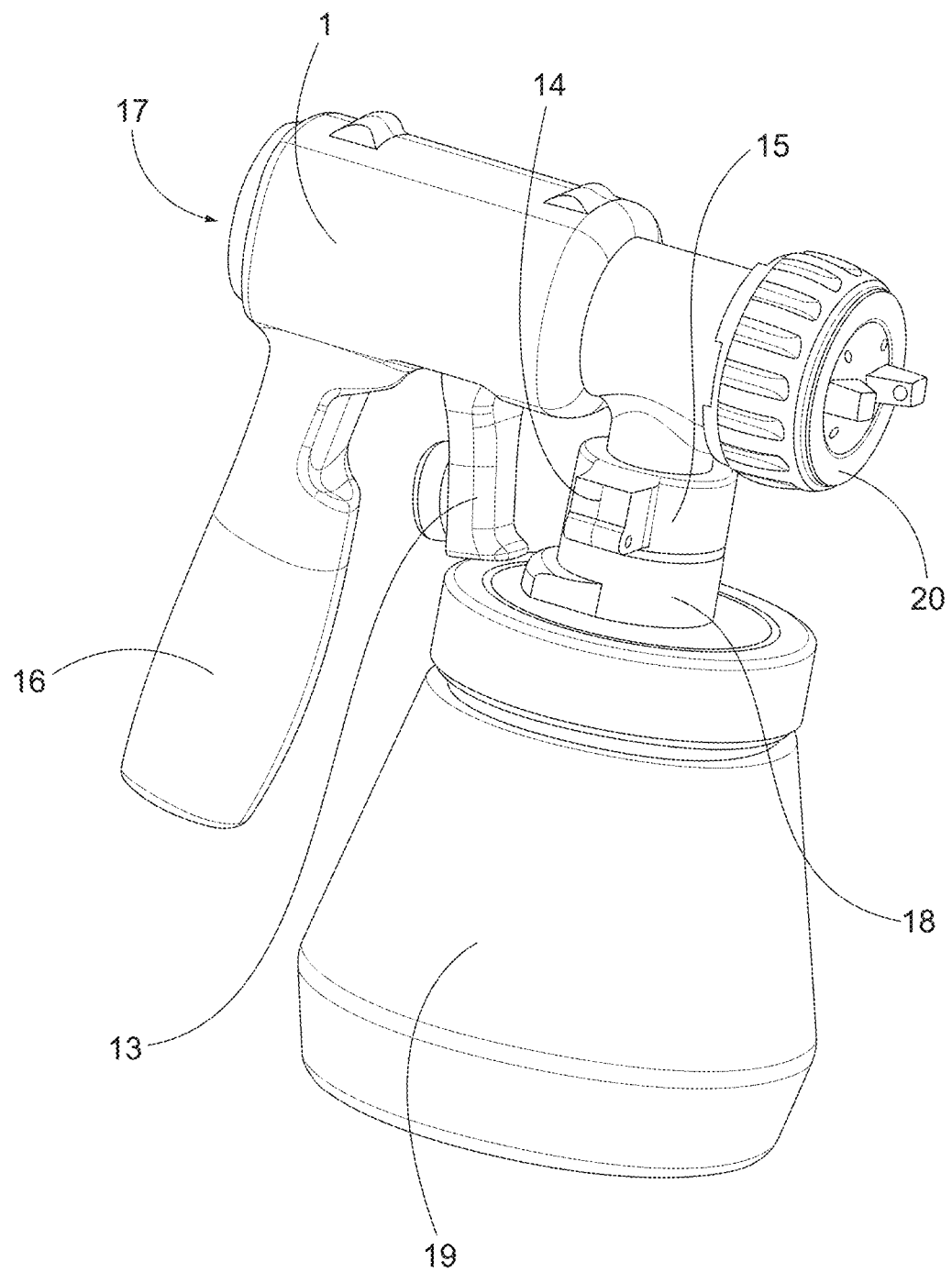
FIG. 3 shows the perspective view of a paint sprayer suitable for use with a pressurized air source according to another embodiment of the invention.
Figure 4:
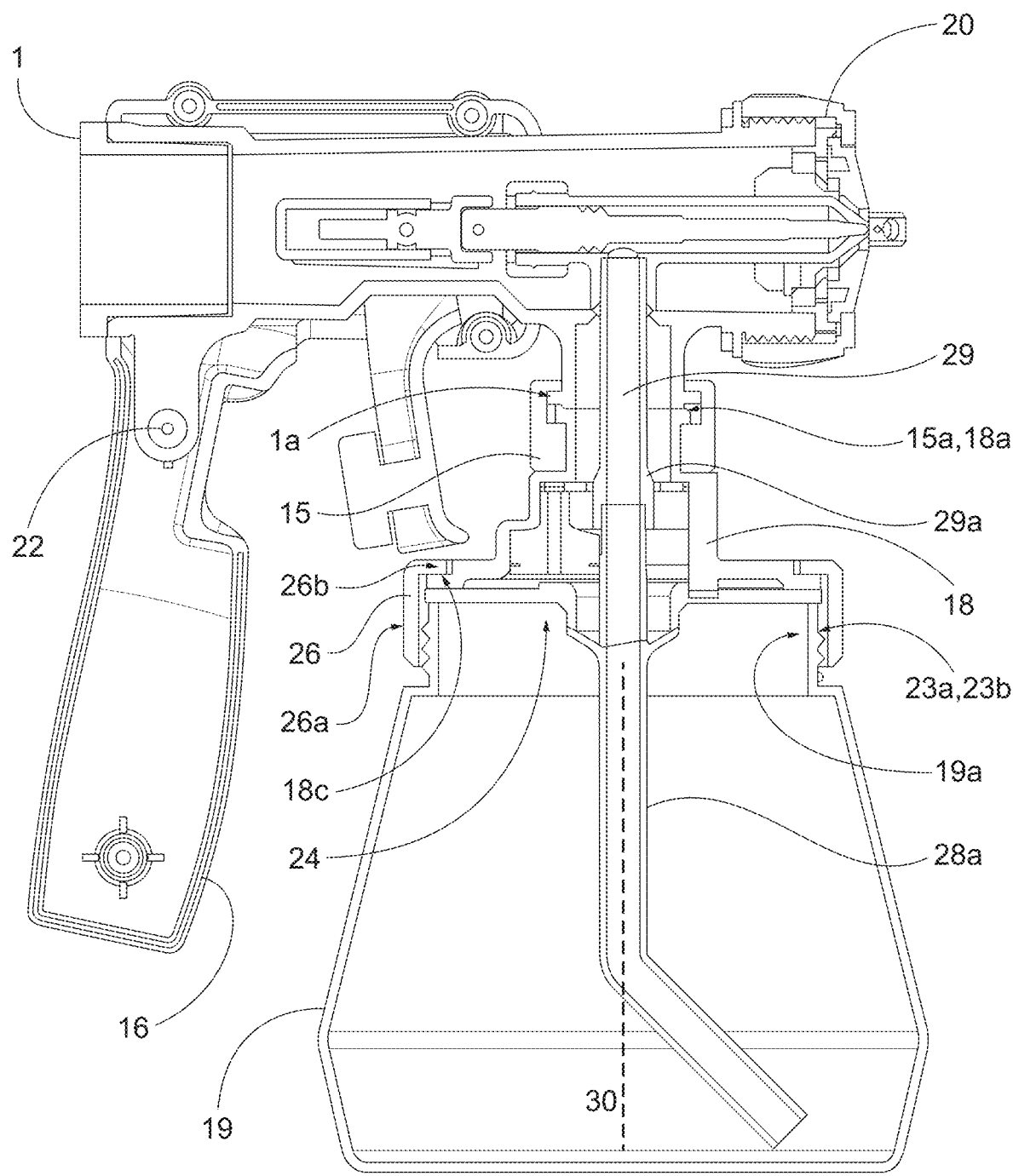
FIG. 4 is a cross-sectional view of the paint sprayer in FIG. 3.

Turning now to FIGS. 3-4, another embodiment of the invention shows a handheld paint sprayer that can be used with an external air source (not shown in FIGS. 3-4) such as the main unit described above and shown in FIGS. 1-2. The paint sprayer contains a housing 1 which contains an air inlet 17 that can be connected for example through a hose (not shown) to the external air source. The housing 1 has an elongated shape and defines a longitudinal direction. The housing 1 further defines a body of the paint sprayer. A handle portion 16 is connected to the housing 1 at a tail end of the housing 1, and the handle portion 16 extends along a direction substantially perpendicular to the longitudinal direction of the housing 1. It should be noted that the handle portion 16 is allowed to pivot relative to the housing 1 within a certain range, as the handle portion 16 is in fact connected through a hinge 22 (shown in FIG. 4) to the housing 1. A nozzle 20 is configured on a head end of the housing 1. It should be noted that the head end of the housing 1 herein means the end from which the paint is ejected/sprayed, and the tail end of the housing 1 means the end at which the air hose is connected. A lever 13 is also connected to the housing 1 in a pivotable fashion as the user actuated switch for ejecting the paint. The lever 13 is positioned close to the handle portion 16 so the user may conveniently use a single hand to hold the handle 16 and also actuates the lever 13. Near the head end of the housing 1, there is also removably connected a paint container 19 through a coupling means that includes a container sleeve 18. The paint container 19 is rotatable relative to the housing 1 subject to the status of a locking device that contains a lock button 14, and a lock sleeve 15. The locking device could be manually operated to prevent the container 19 as well as a feeding tube (not shown) from relative rotation with respect to the housing 1. The container sleeve 18 which is fixed to the housing 1 is removably connected with the container 19, but the container sleeve 18 is adapted to rotate with the container 19 together relative to the housing 1. The handle portion 16, the lever 13 and the container 19 are all connected to a bottom of the housing 1 and are thus located below the housing 1.

FIGS. 4-8 show in more details on how the container 19 can be removably connected to the housing 1 of paint sprayer, and also rotate with respect to the housing 1 paint sprayer while being installed to the latter. As mentioned above, the container 19 is removably connected to the paint sprayer through the container sleeve 18. To achieve this, there are exterior threads 23a formed on a circumferential portion 19a of the container 19 enclosing the opening 24 of the container 19, and correspondingly there are interior threads 23b formed on a circumferential portion 26a which is at the lower end of a container cap 26. The container cap 26 connects to the container sleeve 18. By the engagement of the exterior threads 23a and the interior threads 23b the container 19 therefore is installed to the container cap 26, and in turn to the container sleeve 18 which is connected to the housing 1 as mentioned above. The container sleeve 18 is not removable from the housing 1 during normal use, but container sleeve 18 can rotate relative to the housing 1 as mentioned above.

In particular, at an upper end of the container sleeve 18 there is formed a circumferential rib 18a which is received in an annular groove 15a formed inside the lock sleeve 15. Also received in the annular groove 15a is a circumferential rib 1a formed at a bottom portion of the housing 1 to which the container sleeve 18 is connected. In this way, the container sleeve 18 is always coupled to the housing 1 through the lock sleeve 15, but is at the same time rotatable with respect to the housing 1, subject to the status of the lock device as mentioned above.

Figure 9A:
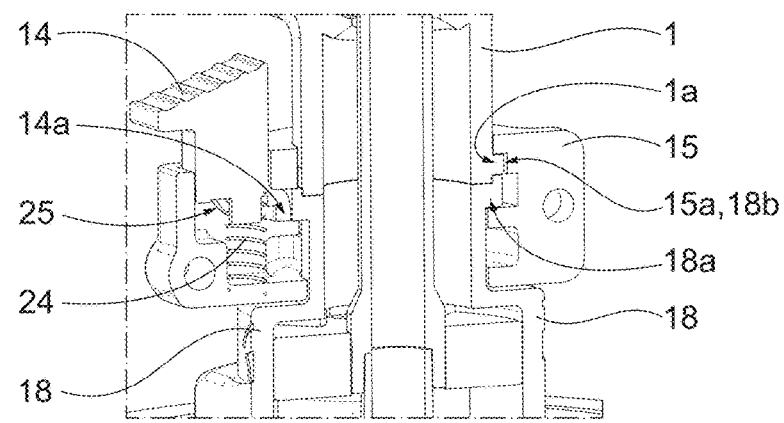
FIGS. 9a and 9b show respectively the status of the lock button and its spring when the lock button is not pressed down and when it is pressed down by the user, in the paint sprayer of FIG. 3.
Figure 9B:
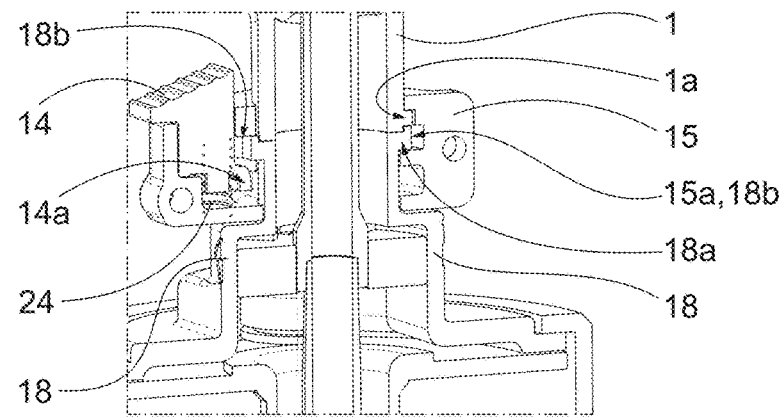
Figures 10A, 10B:
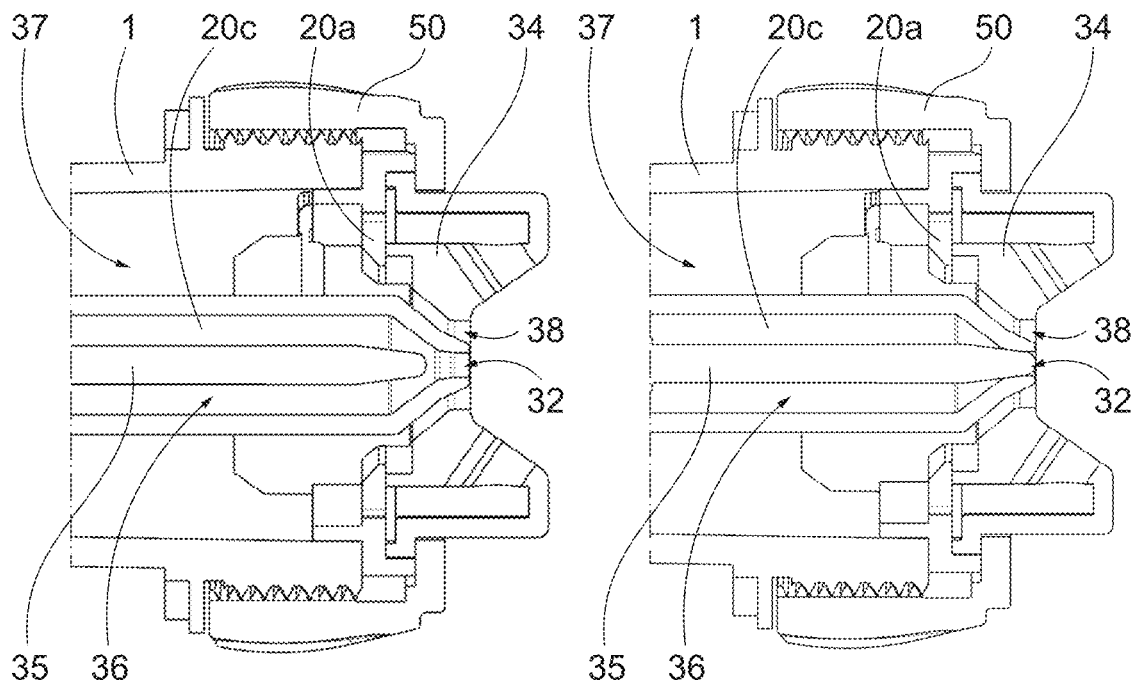
FIGS. 10a and 10b show respectively the status of the needle in its open position and its closed position, in a cross-sectional view of the front end of the paint sprayer of FIG. 3.

FIGS. 7, 8 and 9a-9b show more details about the lock device and the lock sleeve 15. The lock sleeve 15 consists of two halves 15b and 15c, and the lock button 14 is connected to the lock sleeve 15 so that the lock button 14 is generally positioned offset from a central axis of the lock sleeve 15. The lock button 14 is movably received in a channel 25 formed in the lock sleeve 15, as best seen in FIG. 9a. The lock button 14 as a locking member is adapted to move along a direction parallel to a central axis 30 of the container 19 (shown in FIG. 4). The lock button 14 has its one end connected to a spring 24 and forms a detent 14a, and another end of the lock button 4 is suitable for pressing by the user. The spring 24 is connected to the lock sleeve 15 and the spring 24 poses a biasing force to the lock button 14. On the circumferential rib 18a of the container sleeve 18 there are four equidistantly formed notches 18b (best shown in FIG. 8), each one of which is adapted to engage and receive the detent 14a of the lock button 14. The notches 18b are corresponding locking features to the detent 14a.

Figure 5:
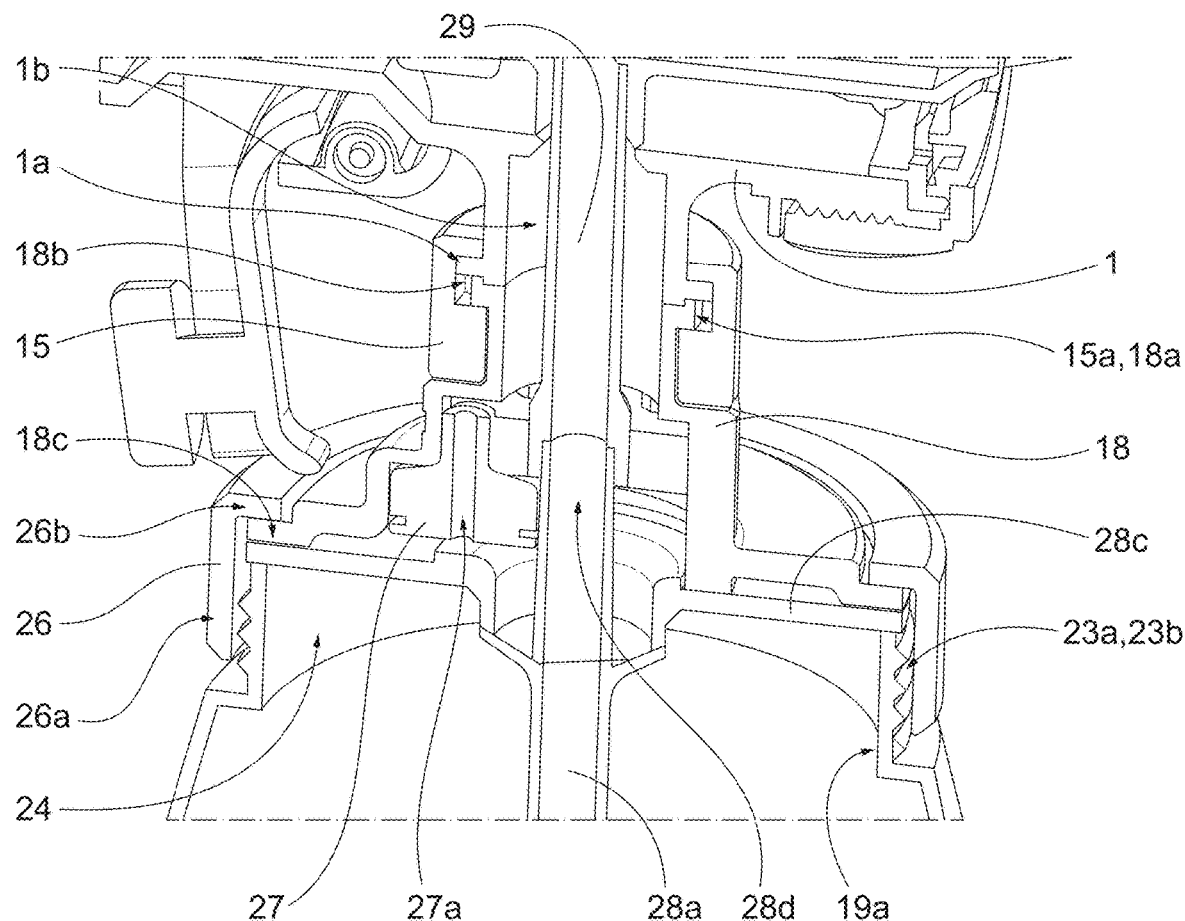
FIG. 5 is a perspective cross-sectional view of the coupling means between the housing of the paint sprayer of FIG. 3 and its container and its feeding tube.

FIGS. 4-6b show details of how the paint channel is constructed from the container 19 to the housing 1 of the paint sprayer. Such paint channel is partially defined by the feeding tube of the paint sprayer and also partially defined by the nozzle 20. The feeding tube is not a single piece. Rather, the entire feeding tube consists of two separate parts which can be conveniently assembled to form the complete feeding tube for putting the paint sprayer into operation. In particular, FIGS. 4-5 show a first part 29 of the feeding tube accommodated within the housing 1. The first part 29 has its top end detachably connected to the nozzle 20 as will be described in more details later. A bottom end of the first part 29 is enlarged and this enlarged portion 29a defines a hole allowing a second part of the feeding tube to removably insert into. The second part of the feeding tube contains integrally formed fixed part 28a and movable part 28b. A top end 28d of the fixed part 28a is inserted into the enlarged portion 29a as mentioned above. The movable part 28b is connected to a bottom end of the fixed part 28a, and the movable part 28b deviates from a central axis 30 of the container 19 which is also the rotation axis of the container 19 and the fixed part 28a. The movable part 28b forms an acute angle with the central axis 30.

An annular-shaped plate 28c is formed integrally with the fixed part 28a of the feeding tube as a single piece, and the radius of the annular-shaped plate 28c is chosen such that it is the same as the largest portion 18c of the container sleeve 18 with the largest radius among all portions of the container sleeve 18. The radius of the annular-shaped plate 28c is slightly smaller than the inner radius of the container cap 26. As shown in FIG. 5, the container cap 26 includes an upper rim 26b extending radially inwardly from the circumferential portion 26a so that the upper rim 26b overlaps with a part of the annular-shaped plate 28c and also a part of the largest portion 18c of the container sleeve 18. The circumferential portion 19a of the container 19 has a radius slightly smaller than that of the annular-shaped plate 28c. Therefore, as shown in FIG. 5 once the container 19 is screwed toward the annular-shaped plate 28c, the circumferential portion 19a of the container 19 presses on the annular-shaped plate 28c, which in turn presses on the largest portion 18c of the container sleeve 18, which in turns presses on the upper rim 26b of the container cap 26. In this way the container cap 26, the second part of the feeding tube and the container 19 are all firmly but removably secured to the container sleeve 18 which as mentioned above is always connected to the housing 1 of the paint sprayer.

Figure 6A:
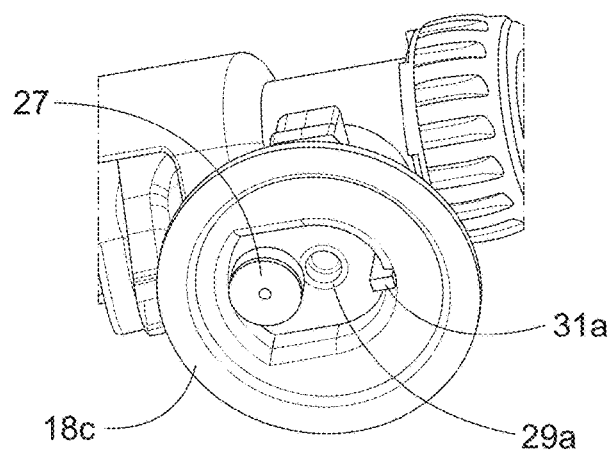
FIG. 6a shows the bottom side of the container sleeve and the valve of the paint sprayer of FIG. 3.
Figure 6B:
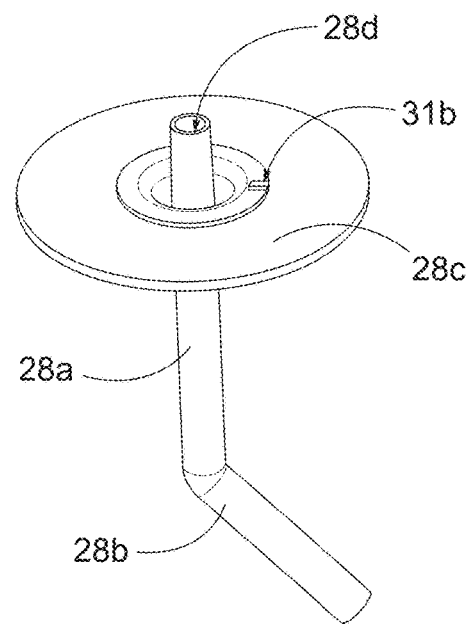
FIG. 6b shows separately a second part of the feeding tube of the paint sprayer of FIG. 3.
Figure 7:
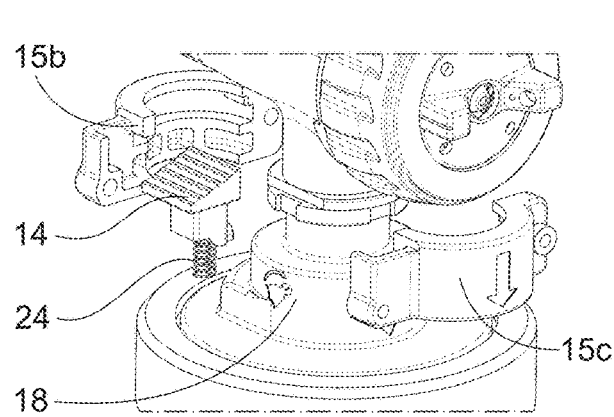
FIG. 7 is a dissembled view of the lock device for the container and the feeding tube in the paint sprayer of FIG. 3.
Figure 8:
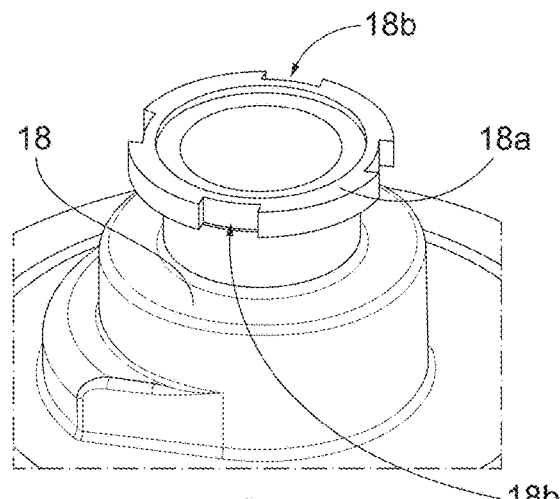
FIG. 8 shows the appearance of the top portion of the container sleeve in the paint sprayer of FIG. 3.

FIGS. 6a and 6b also show a detent 31a formed on the bottom side of the largest portion 18c of the container sleeve 18, and a corresponding recess 31b formed on the annular-shaped plate 28c of the feeding tube. The detent 31a is inserted into the recess 31b when the container 19 and the second part of the feeding tube are assembled, and this prevents from the container 19 from moving relative to the container sleeve 18. In other words, the container 19 and the container sleeve 18 always rotate together once they are assembled.

FIGS. 5 and 6a further show a valve 27 installed inside the container sleeve 18 and which is offset radially from the feeding tube. The valve 27 has a central hollow portion 27a which is in fluid communication with an air channel 1b formed in the housing 1 around the first part 29 of the feeding tube. The air channel 1b itself is in fluid communication with the air inlet 17 of the housing 1. The central hollow portion 27a is also in fluid communication with the interior space of the container 19 through a perforation (not shown) on the annular-shaped plate 28c. The valve 27 is used to let pressurized air to enter the container 19 but not the reverse.

Turning now to FIGS. 10a-11b, which show a structure of the nozzle 20. The nozzle 20 includes an annular part 20a at the center of which an ejection opening 32 is formed. The ejection opening 32 extends out of the annular part 20a. Connected to the annular part 20a is an elongated part 20c which forms a part of the paint channel 36 from the container 19 to the ejection opening 32. A branch part 20b extends from the elongated part 20c downwardly and is in fluid communication with the elongated part 20c. The branch part 20b allows the top end of the first part 29 of the feeding tube (as shown in FIG. 5) to insert thereinto, and the first part 29 can also be detached from the branch part 20b. On the circumference of the annular part 20a there are also configured two studs 33 configured to secure the nozzle 20 to the housing 1, as will be described in more details later. An atomizer cap 34 is installed around the ejection opening 32 to provide air channels and is rotatable, so as to provide different spraying patterns of the paint, as well-known in the art. A collar sleeve 50 is threadly connected with the housing 1 to secure the atomizer cap 34 to the housing 1. The housing 1 defines an air channel 37 around the elongated part 20c of the nozzle 20 and the air channel 37 in in fluid communication with the air inlet 17 of housing 1. The air channel 37 has an outlet 38 formed between the ejection opening 32 and the atomizer cap 34 so that air outputted from the outlet 38 atomizes the paint ejected from the ejection opening 32. A needle 35 is movably accommodated within the nozzle 20 and its operation will be described later.

Figure 12A:
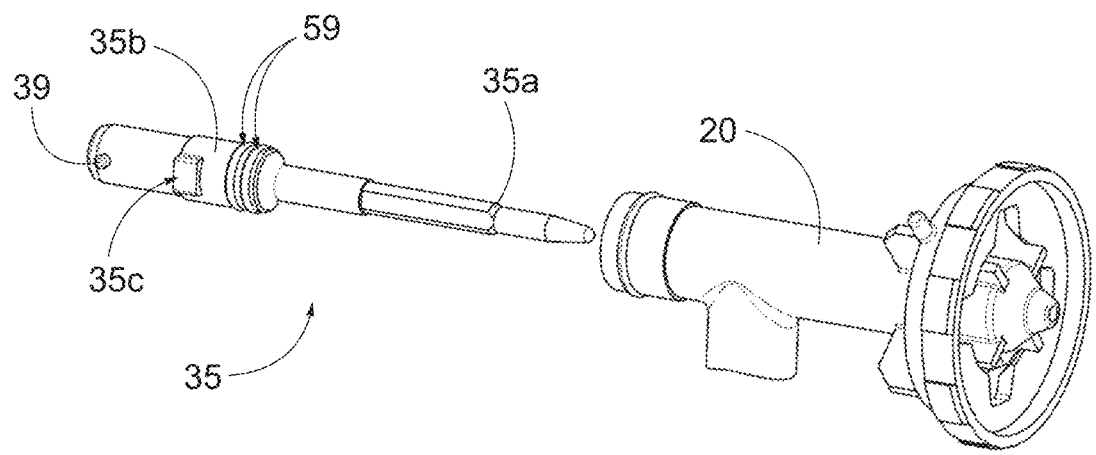
FIG. 12a shows the needle separated from the nozzle in the paint sprayer of FIG. 3.
Figure 12B:
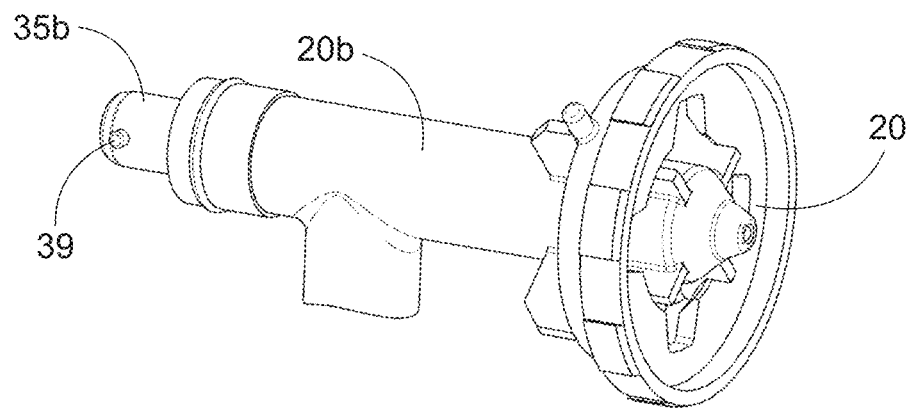
FIG. 12b shows the needle assembled with the nozzle as an assembly in the paint sprayer of FIG. 3.

FIGS. 12a and 12b show the assembly of the needle 35 and the nozzle 20 alone. The needle 35 contains a coupling portion 35b and a front portion 35a. The front portion 35a when the needle 35 is assembled with the nozzle 20 is completely accommodated in the nozzle 20, and the end of the coupling portion 35b is exposed outside of the nozzle 20. The needle 35 acts as a piston for controlling the ejection of paint out of the nozzle 20, and in particular a tip of the front portion 35a can be moved between a closed position and an open position to block or open the ejection opening 32 respectively. On the end of the coupling portion 35b there are formed two protrusions 39 which are used to connect the needle 35 to other components, as will be described in more details below. In addition, once the needle 35 is assembled with the nozzle 20 the two are adapted to rotate together.

Figure 13:
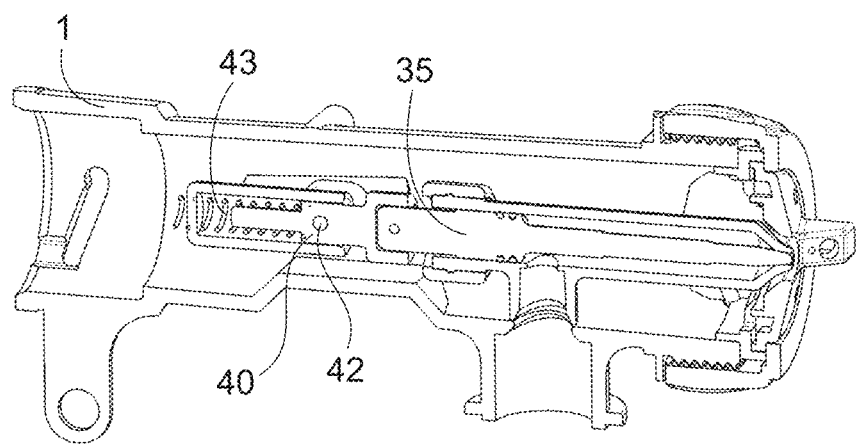
FIG. 13 is a cross-sectional view of the housing in the paint sprayer of FIG. 3, showing the piston coupler, the needle and their connection.

This is achieved by two rectangular recesses 20d inside an opening 20e of the elongated part 20c. The opening 20e is for the needle 35 to insert into the nozzle 20. Correspondingly, there are two rectangular protrusions 35c formed on the coupling portion 35b. The engagement of the protrusions 35c with corresponding recesses 20d lock the needle 35 from relative rotation with the nozzle 20. On the other hand, the coupling portion 35b of the needle 35 has a diameter slightly less than the internal diameter of the elongated part 20c of the nozzle 20 and they friction-fit with each other (as best shown in FIG. 13). The friction-fit is achieved by using sealing rings 59 which are installed into the corresponding inner cylindrical face of the nozzle 20. The sealing rings 59 also prevent the paint from going out from the nozzle 20 other than proceeding to the ejection opening 32.

Figure 14A:
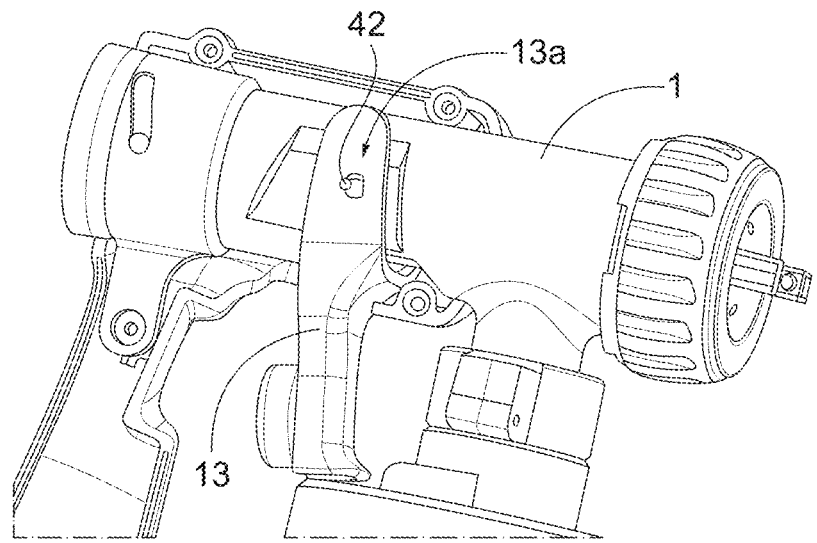
FIG. 14a shows the lever pivotally connected to housing in the paint sprayer of FIG. 3.
Figure 14B:
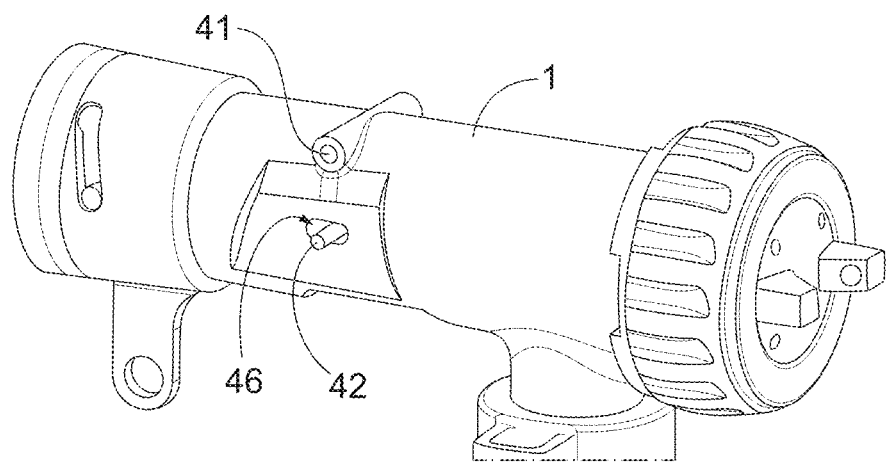
FIG. 14b shows the through hole and the actuation pin on the housing in the paint sprayer of FIG. 3, with the lever hidden.

FIG. 13 shows the structure of the paint sprayer inside the housing 1. The needle 35 as mentioned above is partially received within the nozzle 20. However, the nozzle 20 is not directly connected to a piston coupler 40 that is configured to transmit a user-actuated movement from the lever 13 (shown in FIG. 14a) to the needle 35. The lever 13 is pivotally connected the housing 1 at an upper portion of the housing 1 via a hinge (not shown) that passes through a through hole 41. In particular, the lever 13 contains two wings 13a positioned on two opposite sides of the housing 1 and each of the two wings 13a is connected to an end of the hinge. Also coupled to the lever 13 is an activation pin 42 that is substantially movable together with the lever 13. Similar to the hinge, each end of the activation pin 42 is coupled to one of the two wings 13a of the lever 13. However, different to the hinge which is not configured to move linearly, the activation pin 42 is configured to move within a certain distance as defined by a groove 46 formed on the housing 1. The maximum distance of movement of the activation pin 42 equals to that of the needle 35. The activation pin 42 is adapted to move linearly because it is away from the fulcrum (which is at the through hole 41) of the pivoting movement of the lever 13. The activation pin 42 is also connected to the piston coupler 40 and the two move at the same time. One end of the piston coupler 40 connects to the needle 35 via a turn-to-lock mechanism, and the other end of the piston coupler 40 is connected to the housing 1 via a spring 43. FIG. 15b also shows the activation pin 42 and the spring 43 coupled to the piston coupler 40.

Figure 15A:
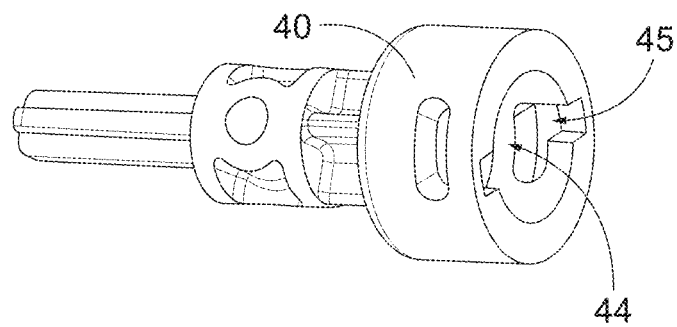
FIG. 15a shows the appearance of the piston coupler in the paint sprayer of FIG. 3 separately.
Figure 15B:
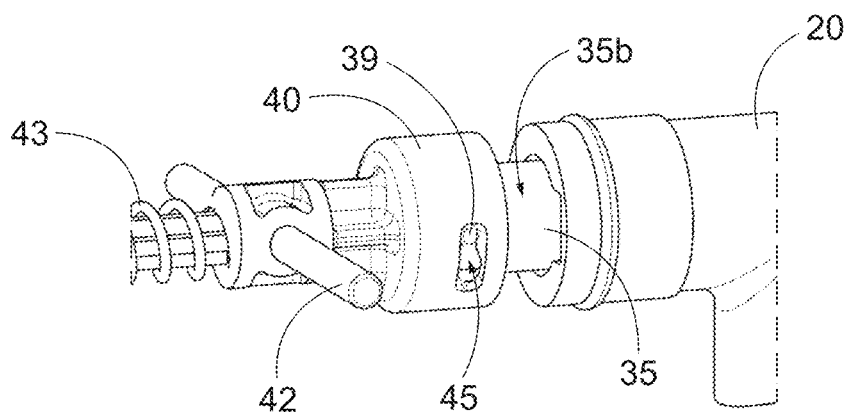
FIG. 15b shows how the needle in the paint sprayer of FIG. 3 is coupled to the piston coupler.

FIG. 15a shows the structure of the piston coupler 40 which implements the above-mentioned turn-to-lock mechanism. On the end of the piston coupler 40 that is intended to couple with the needle 35, there is formed a hole 44 for receiving the end of the needle 35 (which is the end of the coupling portion 35b of the needle 35 shown in FIGS. 12a-12b). On the interior wall of the piston coupler 40 defining the hole 44, there are formed two L-shaped grooves 45 symmetrically along a central axis of the piston coupler 40. The protrusions 39 on the coupling portion 35b of the needle 35 is able to enter the grooves 45 by moving along an axial direction of the piston coupler 40, and then move to a dead end of the grooves 45 along a circumferential direction of the piston coupler 40, which is shown in FIG. 15b.

Turning to FIGS. 16a-16b and 17, which show the assembling of the nozzle 20 to the housing 1. A front end of the housing 1 has an opening 1c to allow the nozzle 20 to be inserted, and the front end is also adapted for installation of the atomizer cap 34 mentioned above by the collar sleeve 50. On the wall of the housing 1 defining the opening 1c, there are formed two L-shaped grooves 47 symmetrically along a central axis of the housing 1. The studs 33 on the annular part 20a of the nozzle 20 are able to enter the opening 1c and move along an axial direction of the housing 1, and then move to a dead end of the grooves 47 along a circumferential direction of the housing 1, which is shown in FIG. 16b. The grooves 47 and the studs 33 therefore form a similar turn-to-lock mechanism as that formed between the needle 35 and the piston coupler 40 as described above. The grooves 47 and the grooves 45 have the same orientations and directions of extension as each other, and this allows the synchronized movements of the studs 33 and protrusions 39. It should be noted that as shown in FIG. 17, when the nozzle 20 is properly installed in the housing 1, the branch part 20b of the nozzle 20 is always facing downwardly to correctly engage with the first part 29 of the feeding tube. This is achieved by the predetermined angular positions of the grooves 47 and the studs 33 on the housing 1 and the nozzle 20 respectively. It should be noted that both the nozzle 20 and the needle 35 are non-rotatable after they are assembled in the paint sprayer due to the presence of the two turn-to-lock mechanisms.

Now turning to the operation of the device described above, FIG. 10a-10b show how the paint sprayer as mentioned above and illustrated from FIGS. 3-16b can be operated to eject/spray paint. The paint sprayer must be connected to a pressurized air source such as the main unit illustrated in FIGS. 1-2, and the latter has to output pressurized air to the paint sprayer. When pressurized air is supplied to the paint sprayer, the air goes into the housing 1 and flows through the air channel 1b formed in the housing 1 (see FIG. 5) to the valve 27, and then to the interior space of the container 19. Within the container 19, the presence of the pressurized air creates a pressure that urges paint stored in the container 19 to leave the container 19. The paint is fed into the feeding tube. As the feeding tube is in fluid communication with the paint channel 36 in the housing 1, the paint then flows into and occupies the paint channel 36. However, if the user does not press the lever 13, that is moving the lever 13 towards the handle portion 16, the needle 35 is kept at its closed position shown in FIG. 10b since the piston coupler 40 connected to the needle 35 is biased by the spring 43 as shown in FIG. 13. In this case, no paint will be ejected from the ejection opening 32 of the nozzle 20. However, if the user presses the lever 13 towards the handle portion 16, then the pivoting of the lever 13 leads to the linear movement of the activation pin 42 which in turns drives the piston coupler 40 to move in a direction that compresses the spring 43. This causes the needle 35 to move also backwardly to the open position shown in FIG. 10a. After this movement of the needle 35 the ejection opening 32 is no longer blocked by the needle 35 and the paint is allowed to be ejected at a high speed. The paint is at the same time atomized by the air flows coming out from the outlet 38 of the air channel 37 formed in the housing 1, and further the pattern of the paint spray is altered according to the orientation of the atomizer cap 34 as additional flows of air coming out from pores (not shown) on the atomizer cap 34 direct the atomized paint to different directions. If the user wants to stop the spraying operation, he/she only needs to release the lever 13, and the ejection opening 32 will be blocked by the needle 35 and no paint will be ejected.

Next, the cleaning process of the internal components of the paint sprayer will be described. As mentioned above the feeding tube of the paint sprayer contains multiple parts, and also the needle as well as the nozzle can be detached from other components of the paint sprayer as an assembly. In particular, with reference to FIG. 4, two separate procedures have to be taken in order to clean the interior of the paint sprayer. The first procedure contains a first step to remove the container 19 from the paint sprayer. This is achieved by rotating the container 19 along a releasing direction while holding the container cap 26 so that there is a relative rotation between the two. The relative rotation results in the container 19 moves along the interior threads 23b of the container cap 26 downwardly so that the container 19 moves gradually away from the container cap 26, and finally detach from the container cap 26. Once the container 19 is removed, the user then removes the second part of the feeding tube including the integrally formed fixed part 28a and movable part 28b, as well as the annular-shaped plate 28c (shown in FIG. 5) by simply pulling the second part of the feeding tube away from the housing 1. In this way, the second part of the feeding tube as well as the container 19 can be washed or otherwise cleaned separately and comprehensively, without having to dissemble other parts of the paint sprayer. To reinstall the second part of the feeding tube as well as the container 19 to the paint sprayer, just perform the reversed steps of the above first procedure.

The second procedure for cleaning the interior of the paint sprayer is to remove the nozzle 20 and the needle 35 as an assembly from the paint sprayer, which should be performed after the above first procedure is performed. In particular, the first step in the second procedure is to remove the collar sleeve 50 (shown in FIGS. 10a and 10b) from the housing 1 by rotation, since the collar sleeve 50 is threadly connected to the housing 1. Then without the securing effect of the collar sleeve 50, the atomizer cap 34 can be simply taken out from the nozzle 20 by pulling it away from the nozzle 20. To remove the nozzle 20 and the needle 35, the user grips the annular part 20a of the nozzle 20 and then rotate it. The rotation of nozzle 20 causes the needle 35 to rotate at the same time. Since the two turn-to-lock mechanisms respectively between the piston coupler 40 and the nozzle 20, and between the nozzle 20 and the housing 1 have the same orientations and operate synchronically, the rotations of the nozzle 20 and the needle 35 allow them to release from the connections with the housing 1 and the piston coupler 40 respectively at the same time. As the first procedure has been completed, the second part of the feeding tube is already removed, so the branch part 20b of the nozzle 20 is now free. Then, the needle 35 and the nozzle 20 can be taken out from the housing 1 easily. In this way, the needle 35 and the nozzle 20 can be washed or otherwise cleaned separately and comprehensively, without having to dissemble other parts of the paint sprayer. To reinstall the needle 35 and the nozzle 20 to the paint sprayer, just perform the reversed steps of the above second procedure.

Figures 18A, 18B:
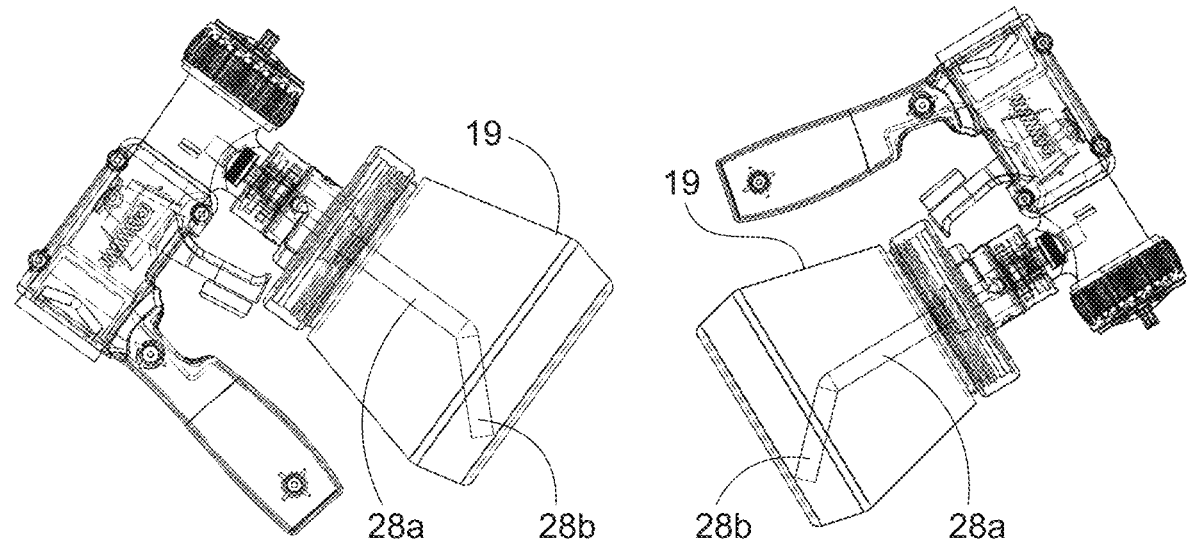
FIGS. 18a and 18b show the paint sprayer facing upwardly and downwardly respectively.

FIGS. 18a and 18b show how the feeding tube, and in particular the movable part 28b of the second part of the feeding tube, can be moved within the container 19. The movable part 28b can be moved to different positions relative to the central axis 30 of the container 19. As mentioned above the container 19 can be rotated together with the second part of the feeding tube due to the engagement between the detent 31a formed on the container sleeve 18 and the corresponding recess 31b formed on the annular-shaped plate 28c of the feeding tube (see FIG. 5). However, in order to enable the assembly to be rotated the user has to press down the lock button 14 of the lock device (see FIG. 7). If the lock button 14 is not pressed down, where it is at an unlocking position, the lock device is in the status shown in FIG. 9a which prevents the container sleeve 18 (and in turn the second part of the feeding tube as well as the container 19) from rotation, since the detent 14a of the lock button 14 is located within one of the four notches 18b on the circumferential rib 18a of the container sleeve 18, and this prevents from the container sleeve 18 from rotation. If the lock button 14 is pressed down by the user by overcoming the force of the spring 24, then the lock button 14 moves to its unlocking position. The lock device is then in the status shown in FIG. 9b where the detent 14a of the lock button 14 escapes the notches 18b on the circumferential rib 18a of the container sleeve 18. As such, the container sleeve 18 (and in turn the second part of the feeding tube as well as the container 19) is able to rotate freely with respect to the housing 1 by the user manipulating the container sleeve 18. After the desired angular position of the second part of the feeding tube is achieved, the user releases the lock button 14 and the container sleeve 18 (and in turn the second part of the feeding tube as well as the container 19) will be locked again.

In FIGS. 18a and 18b the movable part 28b of the feeding tube inside the container 19 exhibits different orientations. This is because the movable part 28b forms an acute angle with the fixed part 28a so the rotation of the fixed part 28a leads to a pivoting movement of the movable part 28b when the user rotates the container sleeve 18. It should be noted that the container 19 always rotates at the same time with the container sleeve 18, but since the container 19 has a rotationally symmetrical shape, it does not change its orientation or position during the rotation, and always look the same as shown in FIGS. 18a and 18b. The movement of the movable part 28b is particularly useful for maximize the amount of the paint in the container 19 that can flow into the feeding tube that would otherwise resides at the corner inside the container 19. Also, when the user holds the paint sprayer to spray upwardly or downwardly as shown in FIGS. 18a and 18b respectively, the movable part 28b can be moved to always point to the lowest portion of the container 19 where the paint (not shown) would stay at.

Figure 19:
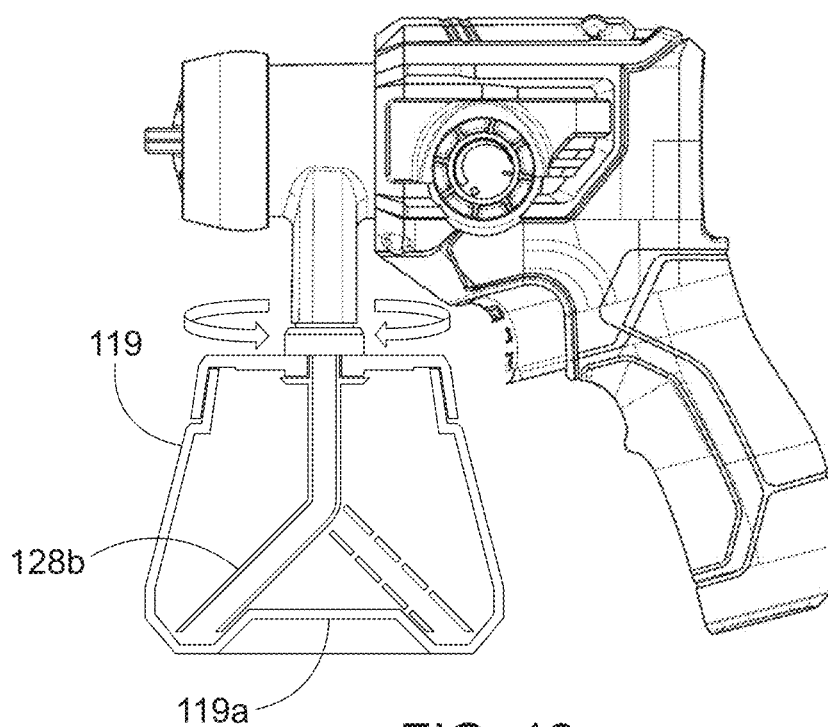
FIG. 19 shows a paint sprayer according to another embodiment of the invention, and in particular its container and feeding tube.

FIG. 19 shows a different embodiment of the invention, where compared to the paint sprayer illustrated in FIGS. 3-18b the bottom of the container 119 in the embodiment shown in FIG. 19 is no longer flat. Rather, it contains a raised center portion 119a. This shape of the container 119 further improves the amount of paint fed into the feeding tube as the remaining space aside the raised center portion 119a is directly accessed by a movable part 128b of the feeding tube.

Figure 11A:
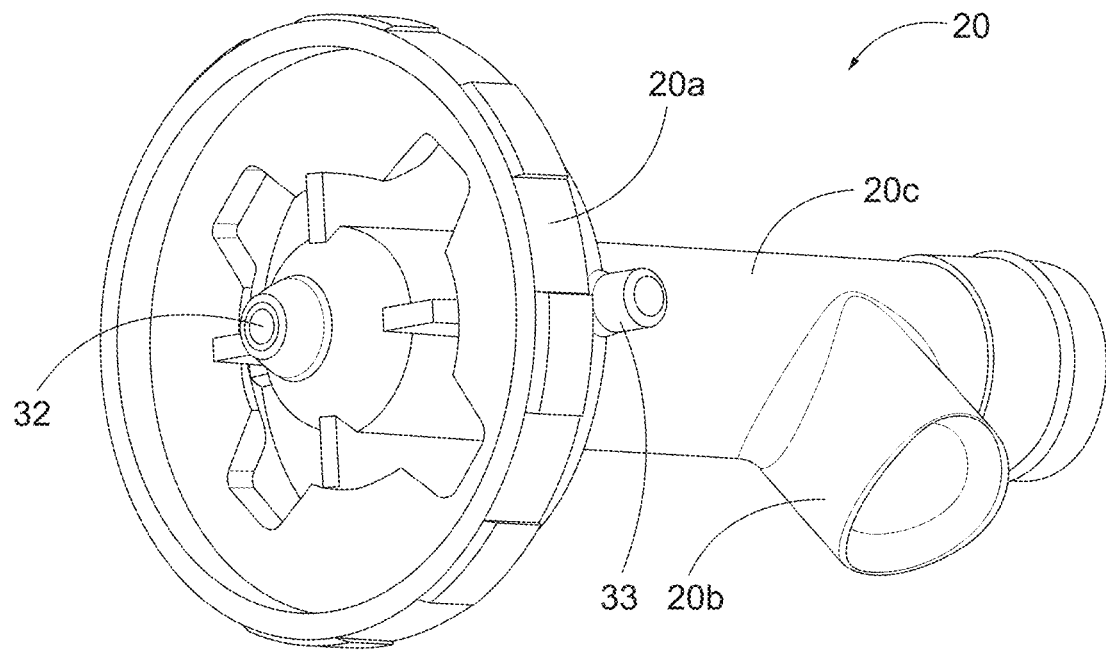
FIG. 11a shows the perspective view of the nozzle of the paint sprayer of FIG. 3 separately.
Figure 11B:
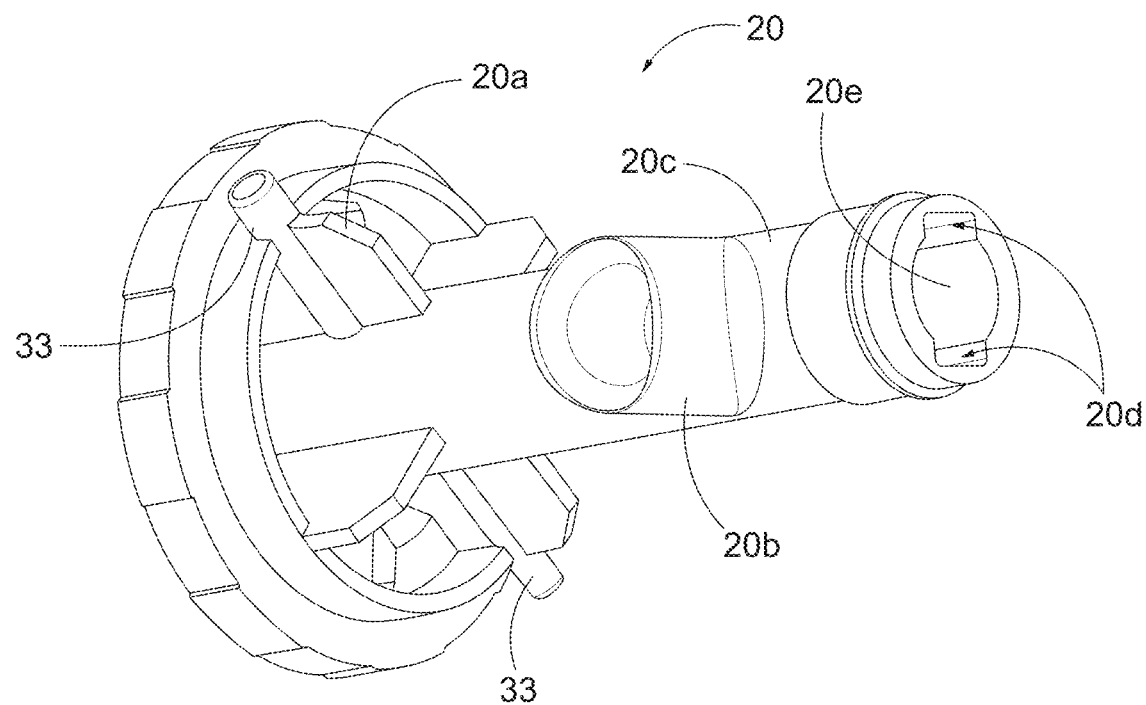
FIG. 11b is the perspective view of the nozzle from another viewing angle.
Figure 20:
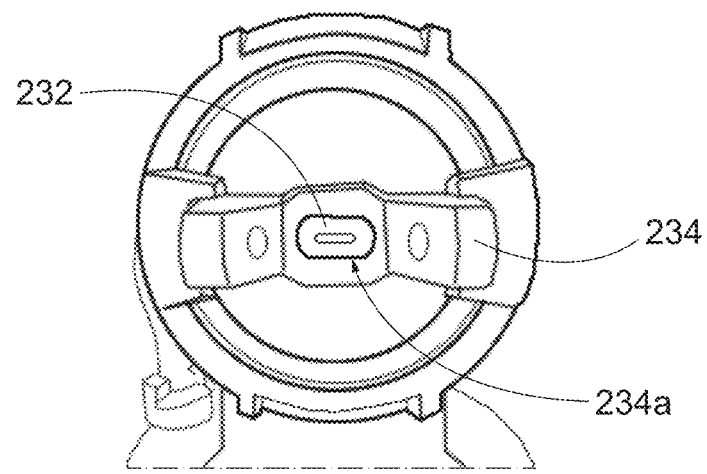
FIG. 20 shows an elliptical-shaped orifice of the nozzle according to another embodiment of the invention.

FIG. 20 shows a further embodiment of the invention, where compared to the paint sprayer illustrated in FIGS. 3-18b the shape of the ejection opening 232 is in an elliptical shape, rather than the round shape as shown in FIG. 11a. The elliptical shape of the ejection opening 232 is suitable for a high-pressure paint spray. Correspondingly the atomizer cap 234 also has an elliptical opening 234a at the center for accommodating the ejection opening 232.

Figures 21A, 21B:
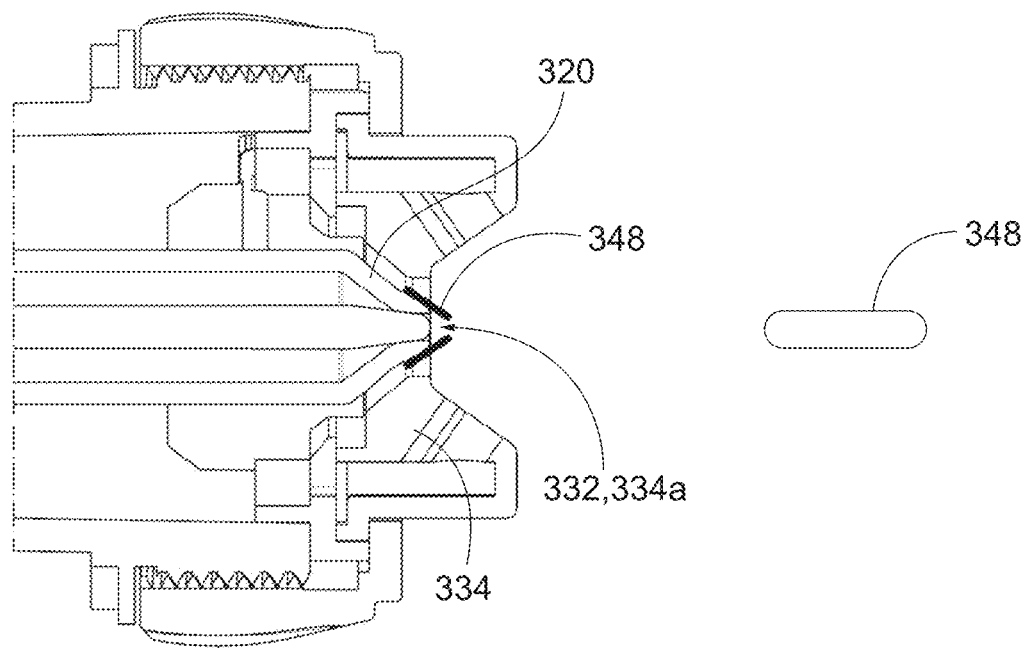

FIGS. 21a and 21b show a further embodiment of the invention, where compared to the paint sprayer illustrated in FIGS. 3-18b there is additionally an adapter 348 attached to the nozzle 320 around the ejection opening 332. The adapter 348 is able to rotate with respect to the nozzle 320 so as to adjust the spray pattern of the paint sprayer, and in particular to output a sprayer pattern as that would be achieved by an elliptical-shaped nozzle opening such as the one shown in FIG. 20, even if the ejection opening 332 of the nozzle 320 and the opening 334a of the atomizer cap 334 are circular.

Figure 22:
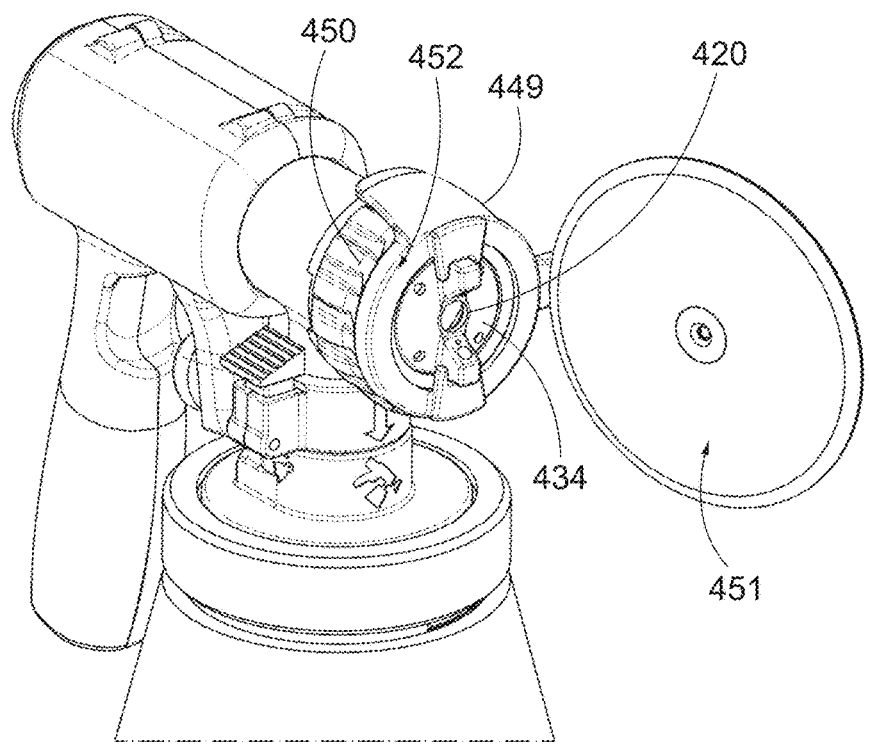
FIG. 22 shows an edger accessory installed to a paint sprayer according to another embodiment of the invention.
Figure 23A:
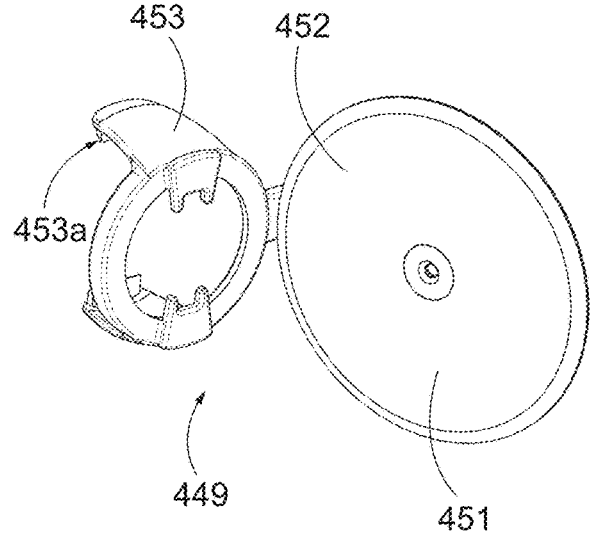
FIGS. 23a and 23b show the appearance of the edger accessory in FIG. 22 alone from different directions.
Figure 23B:
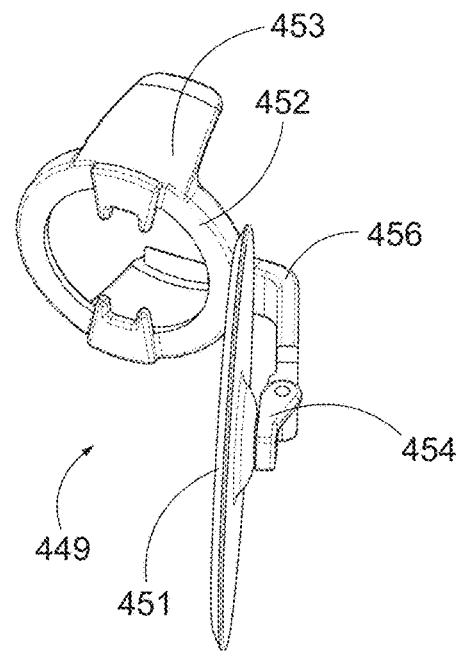
Figure 24:
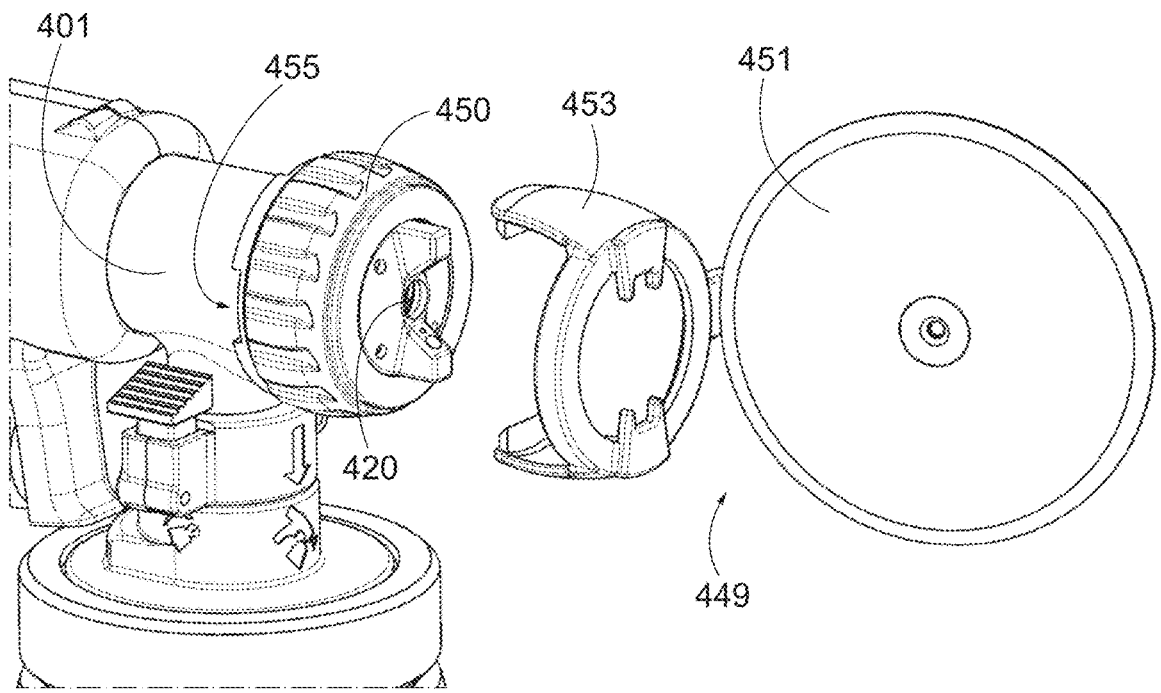
FIG. 24 shows how the edger accessory in FIG. 22 can be installed to the paint sprayer.
Figure 25:
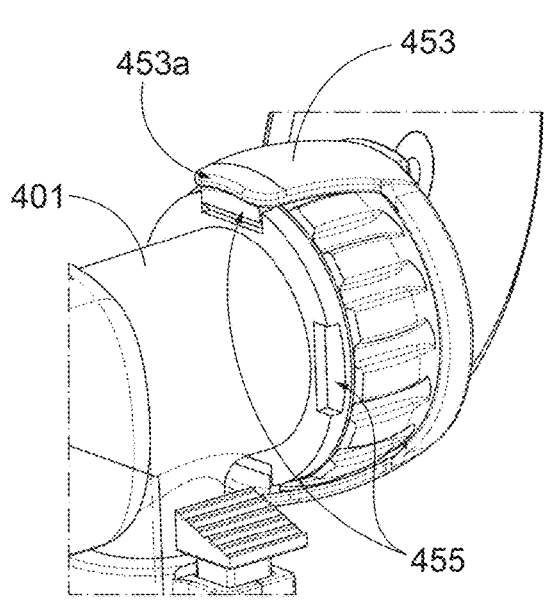
FIG. 25 shows the connection between hook ends of the edger accessory and the recesses on the housing of the paint sprayer in FIG. 22.

FIGS. 22a-26 show a further embodiment of the invention in which an edger accessary 449 is configured to be detachably connected to a paint sprayer. As shown in FIGS. 22 and 25 the edger accessory 449 is connected to and secured to a housing 401 of the paint sprayer, and substantially encloses the collar sleeve 450, the nozzle 420 and the atomizer cap 434. The edger accessory 449 contains a shielding member 451 in a substantially disc shape, which is connected through an arm 456 and an articulating member 454 to a collar ring 452. The collar ring 452 has an annular shape and two hook portions 453 extends from the collar ring 452 along an axial direction of the collar ring 452. The two hook portions 453 are located 180 degrees from each other along the circumferential direction, and a hook end 453a is formed at the tip of each hook portion 453. The hook portions 453 are made of a resilient material.

Figure 26:
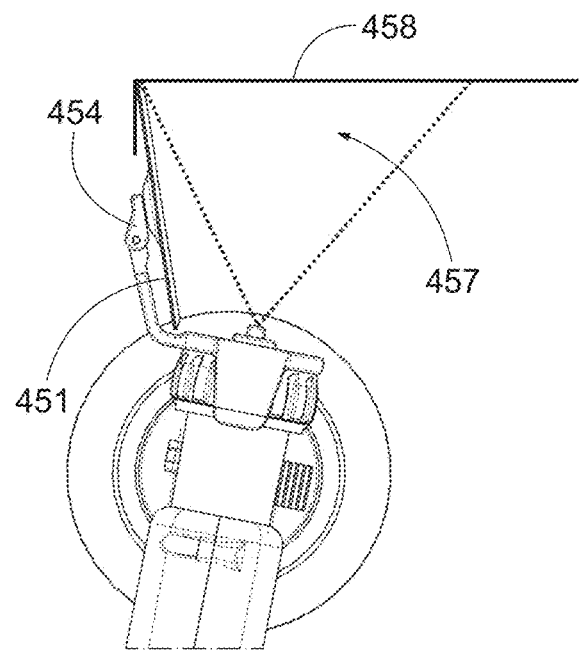
FIG. 26 shows the pattern of the paint sprayer ejected from the paint sprayer in FIG. 22 with the edger accessory.

FIGS. 24 and 25 show that the housing 401 at a portion adjacent to the collar sleeve 450 has four recesses 455 formed equidistantly around the circumferential direction. The recesses 455 are adapted for engaging with the hook end 453a of the edger accessory 449. In other words, the edger accessory 449 can be installed to the paint sprayer in four different orientations/positions. As a result, the shielding member 451 can be substantially located at the top, bottom, left, and right side of the nozzle 420 when viewing along a direction toward the nozzle 420 along a central axis of the nozzle 420. FIGS. 22, 24 and 26 show the shielding member 451 being located at the right side of the nozzle 420. To install the edger accessory 449 to the paint sprayer, as shown in FIG. 24 the user aligns the edger accessory 449 at its intended orientation, and then move it towards the paint sprayer and passes by the collar sleeve 450. Note that the hook portions 453 are made to be apart from each other at a linear distance which is substantially the same as the diameter of the collar sleeve 450. Therefore, when installing the edger accessory 449 over the collar sleeve 450 the hook portions 453 have to deform a little bit and expand radially outwardly. When the hook portions 453 reach the positions shown in FIG. 25, that is when the hook ends 453a come to the recesses 455, the hook ends 453a restore to their original positions thus clamp the collar sleeve 450 as the hook ends 453a secure with their respective recesses 455. In this way the edger accessory 449 is firmly installed to the paint sprayer. Note that the edger accessory 449 can be at any time removed from the paint sprayer using reversed method steps as mentioned above.

FIG. 26 shows the effect of the edger accessory 449 in blocking a spray 457 of the paint so that the spray 457 only reaches at an intended area on a target surface 458, since any unwanted spray which would otherwise goes beyond the intended area would have been stopped by the shielding member 451 of the edger accessory 449. In this way, it is easy for the user to produce a clean and sharp edge of the painted pattern on the target surface 458. The blocking effect of the shielding member 451 can be further adjusted by moving it relative to the arm 456 due to the presence of the articulating member 454 that that shielding member 451 could be located at a desired position/orientation.

In a further embodiment of the invention, the needle and the nozzle are coupled together for co-rotation by using an additional part which is a needle retaining cap. The retaining cap is snap-fitted at the end of nozzle and prevents the needle from falling out from the nozzle.

In yet a further embodiment of the invention, the hook ends of hook portions of the edger accessory no longer engage with any recesses at the housing of the paint sprayer. Rather, the hook ends clamp on a rear, circumferential edge of the collar sleeve which is smooth without any recesses. This means that the edger accessory is adapted to rotate to and be fixed at any angular position within the 360 degrees' range. The edger accessory is therefore clamped to the collar sleeve, and since the collar sleeve is threadedly connected to the housing of the paint sprayer, the edger accessory is also secured. In addition, there are finger members protruding from a front face of the collar ring of edger accessory, which interlinks with similarly protruded horns on the atomization cap so that rotating the edger accessory causes the atomization cap as well. In this way, the edger accessory could work with particular spray pattern and orientation of the atomizer cap.

The exemplary embodiments of the invention are thus fully described. Although the description referred to particular embodiments, it will be clear to one skilled in the art that the invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, although the sprayer described in the embodiments above are used for paints, it should be realized by skilled persons in the art the sprayer according to the invention may be used for any other types of liquid, for example pesticide and liquid scent.

In addition, the handle portion, the lever, and the container of the paint sprayer are illustrated to be located below the housing of the paint sprayer in the embodiments above. However, the invention can be varied to have these components located at different positions/orientations with respect to the sprayer body, such as the container located above the sprayer body (in an up-side-down manner).

Although in some of the embodiments as described above the container sleeve and the container cap are shown as different components. In some variations the container sleeve and the container cap can also be made as a single piece.

In some of the embodiments as described above the first part of the feeding tube which connects to the nozzle, and the second part of the feeding tube are shown as separate parts. However, one skilled in the art should realize that in other variations of the invention, the first part of the feeding tube and the second part of the feeding tube can also be a single long tube with first end to be connected to the elongated part of the nozzle, and the other end extend into the container. Accordingly, in the procedure of dissembling the nozzle and needle assembly for cleaning, the whole feeding tube can be detached at once from the nozzle, and then the nozzle is free to be rotated for releasing it from the housing of the paint sprayer.

Although in some of the embodiments as described above the shielding member of the edger accessory is described in a disc shape, skilled persons should realize that the shielding member may also be in other shapes like rectangular or square shape.

Various features of the invention are set forth in the following claims.

What is claimed is:

1. A liquid dispensing device comprising:
a body;
a nozzle on an end of the body;
a liquid container coupled to the body; and
a piston configured to move in the body to control an ejection of a liquid from the nozzle,
wherein the piston and the nozzle are configured to be detached from the body as an assembly,
wherein the nozzle includes a stud and the body includes an L-shaped groove configured to receive the stud, and
further comprising a piston coupler configured to control the movement of the piston in the body, wherein the piston includes a protrusion and the piston coupler includes an L-shaped groove configured to receive the protrusion.

2. The liquid dispensing device of claim 1, wherein the piston is coupled to the piston coupler with a turn-to-lock structure, and wherein the turn-to-lock structure includes the protrusion and the L-shaped groove of the piston coupler.

3. The liquid dispensing device of claim 1, wherein the nozzle is removably coupled to the body through a turn-to-lock structure, and wherein the turn-to-lock structure includes the stud and the L-shaped groove of the body.

4. The liquid dispensing device of claim 1, further comprising a feeding tube that is in fluid communication with the nozzle, wherein the nozzle includes a liquid channel to which the feeding tube is removably coupled at an angle.

5. The liquid dispensing device of claim 4, wherein the feeding tube includes a first part and a second part that is removably coupled to the first part, wherein the second part is at least partially inserted in the liquid container, and wherein the first part is removably coupled to the nozzle.

6. The liquid dispensing device of claim 5, wherein the first part of the feeding tube extends substantially perpendicularly to the liquid channel of the nozzle.

7. The liquid dispensing device of claim 4, wherein the nozzle includes an annular part defining a liquid outlet, and an elongated part coupled to the annular part and defining at least a part of the liquid channel.

8. The liquid dispensing device of claim 1, wherein when the piston and the nozzle are detached from the body as an assembly, the stud of the nozzle is removed from the L-shaped groove of the body as the protrusion of the piston is removed from the L-shaped groove of the piston coupler.

9. The liquid dispensing device of claim 1, further comprising a lever coupled to the piston coupler and pivotably coupled to the body, and wherein a pivoting movement of the lever causes the piston coupler to move the piston.

10. The liquid dispensing device of claim 9, further comprising an activation pin that is coupled to the piston coupler and the lever, such that movement of the lever causes movement of the piston coupler via the activation pin.

11. The liquid dispensing device of claim 1, wherein the nozzle includes an ejection opening from which the fluid is ejected, and wherein the piston is movable between a position in which the ejection is opening is blocked, such that fluid may not be ejected, and a position in which the ejection opening is not blocked, such that fluid may be ejected.

12. The liquid dispensing device of claim 11, further comprising a spring biasing the piston coupler and the piston toward a position in which the ejection opening is blocked.

13. The liquid dispensing device of claim 12, further comprising an atomizer cap including air channels installed around the ejection opening.

14. The liquid dispensing device of claim 13, wherein the body includes an air channel with an outlet between the ejection opening and the atomizer cap, such that an airflow output from the outlet atomizes the fluid ejected from the ejection opening.

15. The liquid dispensing device of claim 11, wherein the nozzle includes a liquid channel in which the piston is movaeably arranged, the liquid channel terminating at the ejection opening, and wherein the liquid dispensing device further comprises a feeding tube configured to fluidly communicate a liquid from the liquid container to the liquid channel.

16. The liquid dispensing device of claim 15, wherein the feeding tube is removably coupled to the nozzle.

17. The liquid dispensing device of claim 16, wherein the feeding tube includes a first part and a second part that is removably coupled to the first part, wherein the second part is at least partially inserted in the liquid container, and wherein the first part is removably coupled to the nozzle.

* * * * *